US005467002A

United States Patent [19]

Brooks

[11] Patent Number: 5,467,002

[45] Date of Patent: Nov. 14, 1995

[54] ADJUSTABLE CHAIR HAVING PROGRAMMABLE CONTROL SWITCHES

[75] Inventor: David M. Brooks, Cincinnati, Ohio

[73] Assignee: Reliance Medical Products, Inc., Mason, Ohio

[21] Appl. No.: 147,941

[22] Filed: Nov. 5, 1993

[51] Int. Cl.[6] .......... H02P 1/00

[52] U.S. Cl. .......... 318/553; 318/280; 318/446; 318/560; 297/330

[58] Field of Search .......... 318/551, 546, 318/552, 553, 560, 446–466, 280–286; 297/17–60, 258, 284, DIG. 7, 330

[56] References Cited

U.S. PATENT DOCUMENTS

| | | | |
|---|---|---|---|
| Re. 30,648 | 6/1981 | Ohlrogge et al. . | |
| 3,338,632 | 8/1967 | Kleinsorge . | |
| 3,414,324 | 12/1968 | Taylor et al. . | |
| 3,427,072 | 2/1969 | Hale . | |
| 3,792,905 | 2/1974 | Johnson . | |
| 3,934,928 | 1/1976 | Johnson . | |
| 4,128,797 | 12/1978 | Murata | 318/666 |
| 4,264,849 | 4/1981 | Fleischer et al. . | |
| 4,527,976 | 7/1985 | Behringer et al. . | |
| 4,541,671 | 9/1975 | Broadhead et al. . | |
| 4,655,505 | 4/1987 | Kashiwamura et al. . | |
| 4,792,186 | 12/1988 | Benjamin et al. | 297/284 |
| 4,808,897 | 2/1989 | Saito et al. | 318/568 |
| 4,956,592 | 9/1990 | Schulte et al. | 318/560 |
| 4,966,413 | 10/1990 | Palarski . | |
| 5,004,967 | 4/1991 | Ogasawara | 318/568.1 |
| 5,190,349 | 3/1993 | Austin, Jr. et al. . | |
| 5,214,360 | 5/1993 | Gonser et al. | 318/467 |
| 5,243,267 | 8/1993 | Ogasawara | 318/590 |

FOREIGN PATENT DOCUMENTS

| | | |
|---|---|---|
| 442627 | 8/1991 | European Pat. Off. . |
| 2587663 | 3/1987 | France . |
| 2226572 | 12/1973 | Germany . |
| 2098859 | 12/1982 | United Kingdom . |
| 9318575 | 9/1993 | WIPO . |

OTHER PUBLICATIONS

Brochure, "Installation and Operating Instructions", Reliance® Medical Products, Inc., Owner's Manual, Models 880, 980, 981, Apr. 1992.

*Primary Examiner*—David S. Martin
*Attorney, Agent, or Firm*—Wood, Herron & Evans

[57] ABSTRACT

An adjustable chair including a control system based around a microprocessor and operated by way of switches preferably located on each side of the seat back. The switches are low voltage flat membrane switches by which the operator moves the chair to a desired position. The switches present a low voltage and sterile environment for both the operator and the patient. The switches can also be easily programmed by the operator to act either in a "momentary" fashion to cause movement of the chair only as long as they are depressed or in a "maintaining" fashion whereby a single depression of a switch causes selected movement of the chair until such movement is stopped by, for example, a limit switch. In addition, one of the switches can also easily be programmed by the operator to alternatively act as either a recline switch or an "auto up" switch. The auto up switch causes the chair to assume a raised and reclined position suitable for performing a specific medical procedure. The control system of the present invention further provides a switch disable feature which allows the operator to easily program the system to disable the switches thereby preventing unauthorized, potentially dangerous or damaging operation of the chair. A selectively operable switch beep on feature is also disclosed.

48 Claims, 8 Drawing Sheets

ADJUSTABLE CHAIR HAVING PROGRAMMABLE CONTROL SWITCHES

BACKGROUND OF THE INVENTION

The present invention generally relates to lift and recline chairs such as medical examination chairs and, more particularly, relates to a lift and recline chair utilizing a control system having easily programmable switches.

Lift and recline chairs of the type used, for example, during medical, dental and optical examinations and procedures are well known in the prior art. Many times, these chairs are power operated by electric motors or hydraulic motors and may be moved vertically with respect to a base and/or reclined to place the patient in a recumbent or supine position. The chair is moved by the operator, i.e., the doctor, dentist or other medical professional, by way of a plurality of switches which may be attached to the chair itself or made part of a separate switch panel or foot switch assembly. Although various improvements have been made over the years in the switches and control systems for operating such powered adjustable chairs, certain problems and undesirable aspects associated with past designs have become apparent.

In U.S. Pat. No. 3,414,324 issued to Taylor et al. there is disclosed an adjustable chair having a plurality of mechanical switches, including push button switches and a rocker switch, mounted on the side edge of the seat back. Taylor et al. disclose a mechanical means for allowing the push button switches to act as momentary or maintaining switches. That is, each push button switch may either be depressed to cause chair movement only while it is being depressed or depressed and then rotated to cause a lock pin to maintain the switch in a depressed position until a limit switch is activated. The mechanical means for allowing a push button switch to act as either a momentary or maintaining switch as disclosed by Taylor et al. is undesirable because of the relatively short life of the mechanical parts of the switch as well as the relative difficulty of having to push and twist the switch to maintain the connection. Another disadvantage of the switch design disclosed by Taylor et al. is that the use of hard-wired mechanical push button and rocker switches on the side edge of the seat back, while very convenient for the operator, can be dangerous if one of the switches is accidently depressed by being bumped by the operator's body to cause chair movement during an operating procedure. Also, high voltage wiring is typically run through the seat back to connect the hard-wired switches, and that high voltage wiring presents a greater possibility of electrical shock to the doctor and patient.

Taylor et al. further disclose a circuit whereby input commands by an assistant are overridden by input commands by the dentist to avoid conflicting signals. This circuit does not, however, prevent the potentially dangerous or damaging use of the chair by unauthorized personnel.

U.S. Pat. No. 3,934,928 to Johnson discloses an adjustable chair having a "programmable control means" by which a setting is effected manually by the operator to cause the motor to stop the movement of the chair at a desired location between the vertical and horizontal limits of the chair. This control means takes the form of a manually adjustable cam which activates a switch to stop movement of the chair at an intermediate position between the vertical and horizontal limits of the chair. Johnson also discloses the use of a bank of hard-wired switches such as button switches and rocker switches on each side of the seat back. These hard-wired mechanical switches can have the disadvantages noted above with respect to the Taylor patent.

U.S. Pat. No. 4,264,849 to Fleischer et al.; U.S. Pat. No. 4,655,505 to Kashiwamura et al.; and U.S. Pat. No. 5,190,349 to Austin, Jr. et al. each disclose various control systems for chairs or seats which include programmable control systems of various types. For example, Fleischer et al. disclose a closed loop control system which relies on flip-flops, counters, inverting amplifiers, and potentiometers to control the actuation of servomotors. Kashiwamura et al. disclose an adjustable seat having a plurality of air bags embedded in the seat and a control system for storing predetermined air pressure values for the air bags. Austin, Jr. et al. disclose a dental chair including a microprocessor based control system which allows preset positions to be stored and recalled such that activation of a switch moves the chair to one of the preset positions.

SUMMARY OF THE INVENTION

The present invention is directed to an adjustable chair and, more specifically, to the control system for a powered adjustable medical examination and surgical chair. The control system is based around a microprocessor and controls the movement of the chair, for example, between a fully lowered and upright entry/exit position and a fully raised and reclined position. Movement of the chair is preferably directed by way of switch plates located on each side edge of the seat back and comprised of a plurality of low voltage, flat membrane switches. For example, the switch plate on the right side edge of the seat back (from the patient's perspective) may be used by the doctor while the left side switch plate may be used by an assistant. In addition to the low voltage seat back switches, a low voltage foot switch and/or switches disposed on an instrument stand or console may be used to control movement of the chair. The membrane switch plates advantageously present a low voltage and more sterile environment for both the operator and the patient. For example, the flat membrane switches virtually eliminate the possibility of accidental actuation by inadvertent contact with the operator during a medical procedure since they require very direct pressure to be applied for actuation. The flat surface of the switch assembly or plate is also much easier to maintain in a sterile condition than the push button and rocker switch assemblies of past chair designs.

The switches on the switch plates can also be easily programmed by the operator to act either in a "momentary" fashion to cause movement of the chair only as long as they are depressed or in a "maintaining" fashion whereby a single depression of a switch causes selected movement of the chair until such movement is stopped by, for example, a limit switch. In addition, one of the switches can also easily be programmed by the operator to alternatively act, for example, as either a recline back switch (in a momentary or maintaining manner) or as an "auto up" switch. The auto up switch causes the chair to assume a raised and reclined position suitable for performing a specific medical procedure. The "auto up" switch may be programmed from either switch plate but will only cause the right side or doctor's recline back switch to act as an "auto up" switch. This allows the left side or assistant's recline back switch to direct back reclining action separately. The control system of the present invention further provides a disable feature which allows the operator to easily program the system to disable the switches from causing chair movement while power is maintained to the chair thereby making unauthorized operation of the chair more difficult. Finally, a beep on function is programmable to allow the operator to cause an audible signal to be generated upon any switch actuation.

In the preferred embodiment of the invention, six flat membrane switches are located on each side edge of the seat back. The switches include "raise seat", "lower seat", "raise back", "recline back", "stop", and "auto" switches. The "raise seat", "lower seat", "raise back" and "recline back" switches are easily programmed by the operator to act as momentary or maintaining switches by, for example, providing a unique, predetermined switch actuation. Other predetermined input switch actuations provide other unique chair operation modes.

The disable feature of the present invention allows the operator to "lock out" or disable all of the switches that operate the chair by simply pressing a combination of switches. In the disabled condition, and with power still being directed to the chair, none of the switches connected with the control system are operative to cause chair movement. A separate command is given by the operator to unlock or enable operation of the switches. This unlock command is preferably given by depressing the same combination of switches used to disable the switches. Thus, the present invention provides a very easy method for the operator to disable any powered chair movement when the operator is not present to supervise.

Further advantages and features of the present invention will become more readily apparent from a review of the following detailed description thereof taken in conjunction with the accompanying drawings.

BRIEF DESCRIPTION OF THE DRAWINGS

FIG. 13 is a flow chart showing the process steps of the Adjustable Limit Switch subroutine in the main routine of

FIG. 6;

DETAILED DESCRIPTION OF THE PREFERRED EMBODIMENT

Figure 1:
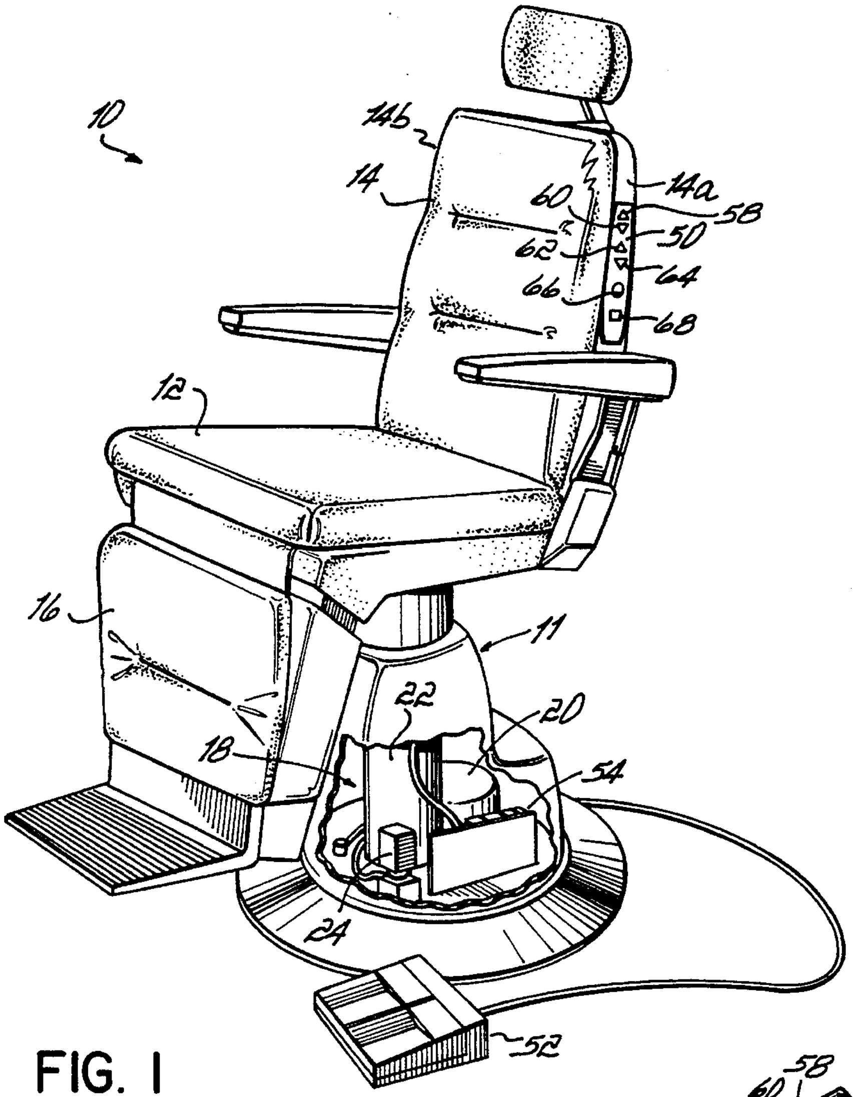
FIG. 1 is a perspective view of an adjustable chair in accordance with the present invention and shown in the patient entry/exit position.
Figure 2:
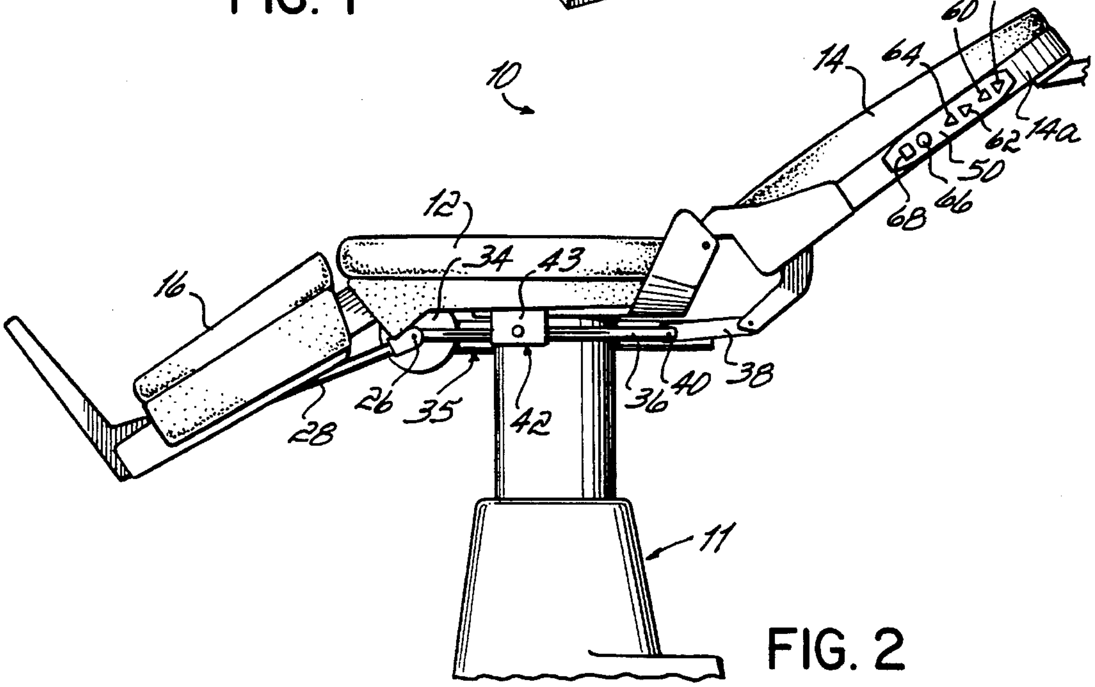
FIG. 2 is a side elevational view of the chair shown in a raised and reclined patient operating or examination position.

Referring to the drawings in detail, FIGS. 1 and 2 illustrate an adjustable chair 10 in accordance with the present invention. Chair 10 is particularly adapted for use in operative procedures to support a patient therein and position the patient between a fully lowered, upright entry/exit position as shown in FIG. 1 and a raised and reclined operating or examining position as shown in FIG. 2. Adjustable chair 10 generally includes a base 11, a seat 12, a back 14 hingedly secured in a conventional manner along a rear edge of the seat 12 and a chair apron 16 hingedly secured in a conventional manner along a front edge of the seat 12. Chair base 11 includes a conventional lift mechanism 18 for vertically raising and lowering the seat 12 and attached seat back 14 and apron 16 with respect to the base 11. It will be appreciated that the specific mechanical design of the chair 10 shown in FIGS. 1 and 2 is illustrative as many other designs may utilize the inventive concepts disclosed herein.

A first powered motion mechanism of chair 10 comprising a lift mechanism 18 may comprise any one of several designs known in the art, but preferably includes a hydraulic fluid pump and motor assembly 20 for operating a lift cylinder 22. The lift cylinder 22 includes a piston (not shown) which is connected to the seat 12 such that when pump and motor assembly 20 is energized, hydraulic fluid from a fluid reservoir 134 (shown schematically in FIG. 5) is delivered under pressure to lift cylinder 22 and the seat 12, back 14 and apron 16 are raised vertically with respect to chair base 11. A limit switch 138 (FIG. 5) is provided to de-energize pump and motor assembly 20 when lift cylinder 22 has reached its fully raised position as shown in FIG. 2. Lift cylinder 22 is also in fluid communication with the hydraulic fluid reservoir by way of a normally closed solenoid valve 24 which opens and bleeds off hydraulic fluid from the lift cylinder upon energization thereof to thereby lower the seat 12 and attached back 14 and apron 16 by gravity force. A suitable hydraulic lift mechanism is fully described in pending U.S. patent application Ser. No. 08/081,965, assigned to the assignee of the present invention and hereby fully and expressly incorporated by reference herein.

A second powered motion mechanism which causes pivotal or angular movement, that is, either raising or reclining, of the back 14 relative to the chair seat 12 and simultaneous corresponding retraction and extension of apron 16 relative to seat 12 is provided by an electric actuator or chair motor 34 which is mechanically linked to chair back 14 through a conventional endless screw and push rod assembly 35. A suitable reclining mechanism is disclosed in U.S. Pat. No. 3,792,905 which is hereby fully and expressly incorporated by reference herein. Chair motor 34 is reversible such that the screw can be rotated in opposite directions to adjust the seat back 14 and apron 16 between upright and reclined positions. A pair of limit switches 126, 130 (FIG. 5) are provided to de-energize chair motor 34 when chair back 14 and apron 16 have reached their respective fully upright and fully reclined positions. Horizontal movement of a chair back push rod is correspondingly translated to chair apron push rod 36 which is disposed intermediate hinge 40 of back link 38 and hinge 26 of apron link 28 such that chair apron 16 moves between upright and reclined positions when chair back 14 is so moved.

It will be appreciated that a chair utilizing the control system of the present invention, to be described below, may incorporate many alternative powered motion mechanisms. For example, a power tilt mechanism may be employed rather than the power recline mechanism described above such that the chair seat and chair back are reclined or tilted simultaneously to an operative position and also simultaneously back to an entry/exit position. A powered adjustable chair utilizing the control system of the present invention may alternatively include only a power lift mechanism or only a power recline mechanism or, for example, a power tilt mechanism as mentioned above in conjunction with a power lift mechanism.

Figure 2A:
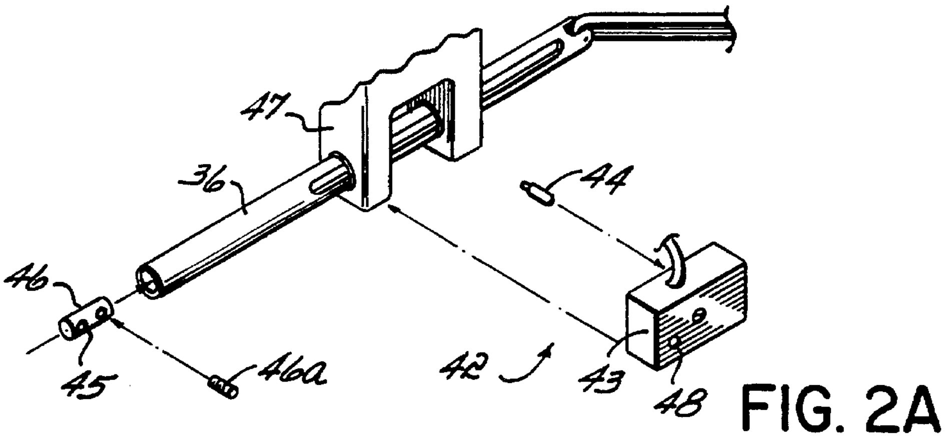
FIG. 2A is partial disassembled perspective of the adjustable limit switch of the present invention.

Chair 10 also preferably includes a low voltage adjustable limit switch assembly 42 which enables the chair operator to select a preferred position for both the chair back 14 and apron 16 intermediate the fully upright and fully reclined positions. The adjustable limit switch assembly 42 will automatically stop reclining motion of the back 14 and apron 16 by deenergizing the chair motor 34 when the selected position is reached. As shown in FIG. 2A, switch assembly 42 includes a normally open limit switch 43 having a switch plunger 44 for electrically closing switch 43 when the actuating knob 45 of an adjustable switch actuator 46 secured within push rod 36 depresses the plunger 44 during reclining movement of the chair back 14 and apron 16. The actuator 46 is adjustably slidable along push rod 36 and may be locked at a desired position along the length of push rod 36 by a set screw 46*a* to define the desired amount of chair reclination. The switch 43 is rigidly secured to the base 11 of chair 10 by way of brackets 47. An LED 48 on switch assembly 42 is activated when the plunger 44 is tripped by the actuating knob 45. To set the desired reclined operating or examination chair position, the back is reclined to a desired position, and the actuator 46 is slid along the push rod 36 until the LED is turned on. The actuator 46 is locked at that set position by set screw 46*a*, and the limit switch can then be used to stop the back at the desired set position.

Figure 3:
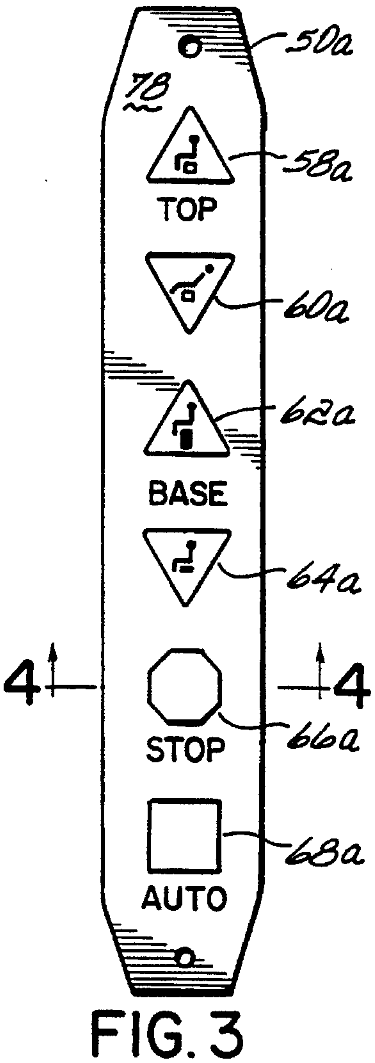
FIG. 3 is an enlarged top view of the right side or doctor's membrane switch plate used on the right side edge of the chair back.
Figure 4:
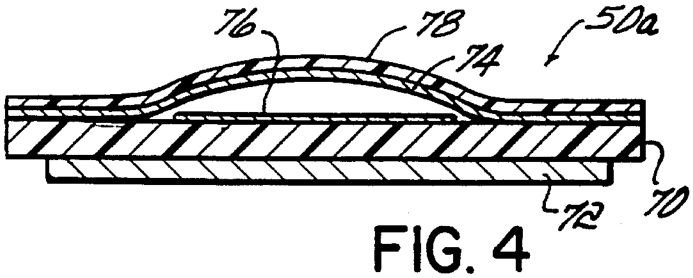
FIG. 4 is a schematic cross-sectional view of the membrane switch plate of FIG. 3 taken along line 4—4.

As will be described in more detail below, operator control of chair 10 is preferably provided by two membrane switch plates 50, 50*a* mounted on respective side edges 14*a*, 14*b* of chair back 14, a removable low voltage foot switch 52, and an optional instrument control stand 84 shown schematically in FIG. 5. Switch plates 50, 50*a*, are identical in design. Switch plate 50*a*, shown in detail in FIGS. 3 and 4, is preferably disposed on the right side edge 14*b* of the seat back, for example, as the doctor's switch plate while switch plate 50 is disposed on the left hand side edge 14*a* and is used as the assistant's switch plate as further described below. Of course, only one switch plate may be used if desired and it may then be located on either desired side edge 14*a* or 14*b*. Operator command inputs from these various switch sources are electrically coupled to a control circuit 54 which is located within base 11 (FIG. 1). Output signals from control circuit 54 are connected to pump motor 20 and chair motor 34 in response to operator command inputs such that chair 10 moves to a desired position.

As shown in FIG. 3 specifically illustrating right hand switch plate 50*a*, each membrane switch plate 50, 50*a* includes six switches for controlling movement of chair 10. It will be appreciated that the general description of switches located on switch plate 50*a* applies to switch plate 50 as well. Membrane switch plate 50*a* includes a "RAISE BACK" switch 58*a*, a "RECLINE BACK" switch 60*a*, a "RAISE SEAT" switch 62*a*, a "LOWER SEAT" switch 64*a*, a "STOP" switch 66*a* and an "AUTO" switch 68*a*. Membrane switch plate 50*a* further includes text indicia of "TOP," "BASE," "STOP," and "AUTO" which are backlit by four LED's (not shown) to facilitate operation of chair 10 in darkened rooms. The terms "TOP" and "BASE" respectively refer to the raise and recline back switches 58*a*, 60*a* and the raise and lower seat switches 62*a*, 64*a* on switch plate 50*a*. Left hand switch plate 50 includes identical switches and indicia to those of switch plate 50*a*. Operation of switches 58*a*, 60*a*, 62*a*, 64*a*, 66*a* and 68*a* on switch plate 50*a* as well as operation of switches 58, 60, 62, 64, 66 and 68 of switch plate 50 will be discussed in more detail with reference to FIG. 6.

FIG. 4 shows a cross-sectional view of membrane switch plate 50*a* taken along line 4—4 of FIG. 3. Membrane switch plates 50, 50*a* have a size, shape, layout, and icon design that is unique to applicant, but their general structure and operation is typical of membrane switches that are commercially available from Bergquist Switch Company of Minneapolis, Minn. As shown in FIG. 4, Membrane switch plate 50*a* (as well as switch plate 50) generally includes a printed circuit board 70 (0.063 FR-04) having copper traces 72 for connecting switches 58*a*, 60*a*, 62*a*, 64*a*, 66*a* and 68*a* to each other and to a pair of connectors (not shown). For each switch 58*a*, 60*a*, 62*a*, 64*a*, 66*a* and 68*a*, the printed circuit board 70 further includes a stainless steel dome contact 74 mounted adjacent a hard nickel plated copper switch contact 76 such that dome contact 74 is electrically isolated from switch contact 76 until dome contact 74 is depressed by the chair operator, thereby closing contacts 74, 76 and creating a circuit therebetween. Dome contact 74 and switch contact 76 are sealed by a polyester graphic overlay 78 to prevent contamination of switch contacts. In this way, membrane switch plate 50*a* provides tactile-feel switches which safely operate under low voltage and which are easily cleaned or sterilized, due to the polyester graphic overlay 78, to prevent bacteria growth on the switch plate.

Figure 5:
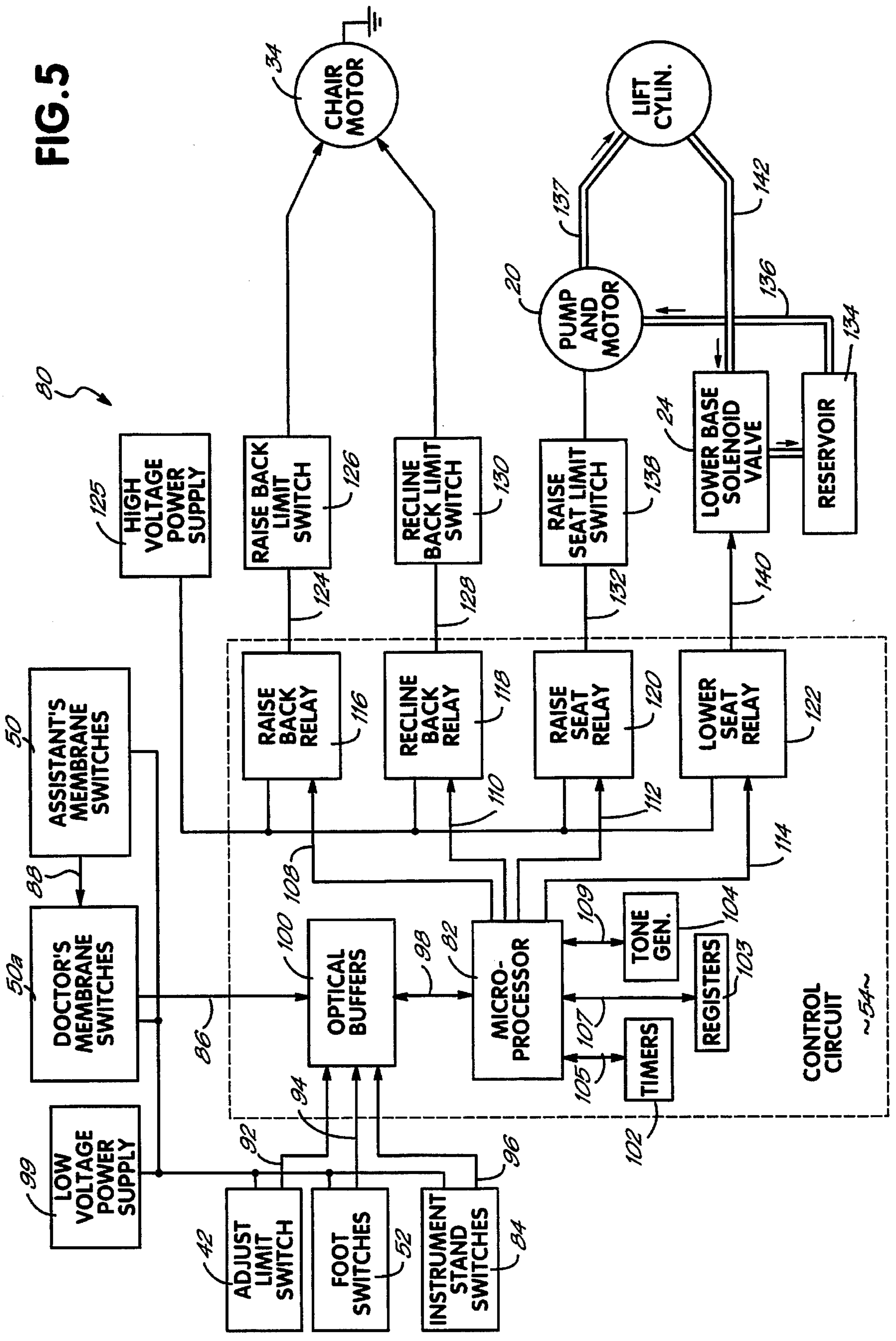
FIG. 5 is a schematic block diagram of a control system for operating the chair.

With reference to FIG. 5, a block diagram of control system 80 is provided in accordance with the present invention. Control system 80 includes an 8-bit microprocessor 82 (MOTOROLA MC68HC705J2P) which controls overall movement of chair 10. Preferably, microprocessor 82 and related control logic are mounted on a printed circuit board and comprise a control circuit 54. As will be described in more detail below in FIG. 6, microprocessor 82 is programmatically responsive to switch inputs from doctor's membrane switch plate 50*a*, an assistant's membrane switch plate 50, adjustable limit switch 42, foot switches 52 and instrument stand switches 84 for operating hydraulic pump and motor assembly 20 and chair motor 34.

Control circuit 54 includes membrane switch input line 86 from right and left membrane switch plates 50*a* and 50. The left hand or assistant's switch plate 50 is daisy-chained to the right hand or doctor's switch plate 50*a* through a ribbon cable 88 coupled to rear connectors (not shown) of each membrane switch plate 50, 50*a* such that switch inputs can be received from either side of chair back 14 through line 86.

Control circuit 54 further includes switch inputs from adjustable limit switch assembly 42 through line 92, from foot switches 52 through line 94 and instrument stand switches 84 through line 96. Preferably, the low voltage foot switches 52 include input switches that provide independent input command signals to raise and lower the seat 12, recline the chair 10 and automatically move the chair 10 to the entry/exit position. The instrument stand switches 84 may be high voltage or low voltage switches and preferably provide input command signals to raise and lower the seat 12 and move the chair 10 to the entry/exit position. Each of the foot switches and instrument stand switches provides an output appropriate signal for a duration commensurate with the duration of the respective switch is actuated.

As further shown in FIG. 5, switch inputs from lines 86, 92, 94 and 96 are operatively connected to the microprocessor through optical buffers 100 (SHARP PC845). The optical buffers 100 provide an interface circuit which electrically isolates the inputs 86, 92, 94, 96 from the microprocessor terminals connected to input and output lines 98. In this way, only a low voltage signal, from a power supply 99 in a preferred range of +5 V to +12 V, is used to operate chair 10 from switch plates 50, 50*a* on chair back 14. Therefore, chair back 14 only contains low voltage lines. This provides a better environment for the patient, doctor and assistant over past hard wired switches which may require high voltage, e.g. 110 V, wiring within the chair back 14. As shown, the foot switches 52 and instrument stand switches 84 may also be low voltage switches. Switch inputs to microprocessor 82 over line 98 are decoded and validated by microprocessor 82 which is operatively connected with timers 102, registers 103 and tone generator 104 by way of lines 105, 107 and 109, respectively.

Output signals on lines 108, 110, 112, and 114 are provided on output ports of the microprocessor 82 and individually control movement of chair 10 through solid state relays (SHARP S202S02) 116, 118, 120 and 122, respectively, as will be described in more detail below. Solid state relays 116, 118, 120 and 122 are tied to a high voltage power supply 125 which is preferably 115/230 VAC, and provide isolation between microprocessor output lines 108, 110, 112, and 114 and the pump and motor 20, solenoid valve 24 and chair motor 34.

In operation, a "RAISE BACK" output signal from an output port of microprocessor 82 by way of line 108 will cause raise back relay 116 to send a signal over line 124 to energize chair motor 34, thereby raising chair back 14 and retracting apron 16. When chair back 14 is fully raised and apron 16 is fully retracted, raise back limit switch 126 will open, thereby deenergizing chair motor 34. A "RECLINE BACK" output signal on line 110 will cause recline back relay 118 to apply a suitable signal over line 128 to energize chair motor 34 in an opposite direction, thereby moving chair 10 into a reclined position by reclining chair back 14 and extending apron 16. When chair back 14 is fully reclined and apron 16 is fully extended, recline back limit switch 130 will open, thereby de-energizing chair motor 34.

In a similar fashion, a "RAISE SEAT" output signal sent by way of line 112 will cause raise seat relay 120 to apply a suitable signal over line 132 to energize pump and motor 20. In this way, pump and motor assembly 20 directs pressurized hydraulic fluid from reservoir 134 through fluid lines 136 and 137 to lift cylinder 22, thereby raising seat 12 and the attached chair back 14 and apron 16 (FIGS. 1 & 2). When chair seat 12 is fully raised, raise seat limit switch 138 will open, thereby de-energizing pump and motor assembly 20. A "LOWER SEAT" output signal on line 114 will cause lower seat relay 122 to send a suitable signal over line 140 to open solenoid valve 24, thereby directing hydraulic fluid from lift cylinder 22 into reservoir 134 through fluid line 142 and thus vertically lowering the seat 12, and attached back 14 and apron 16 by gravity. As will be described in more detail below, "RAISE BACK", "RECLINE BACK", "RAISE SEAT" and "LOWER SEAT" output signals produced on output ports of microprocessor 82 by way of lines 108, 110, 112 and 114 respectively, in response to actuation of switches on the membrane switch plates 50, 50*a* can be programmed to operate as either momentary or maintaining signals.

Figure 6:
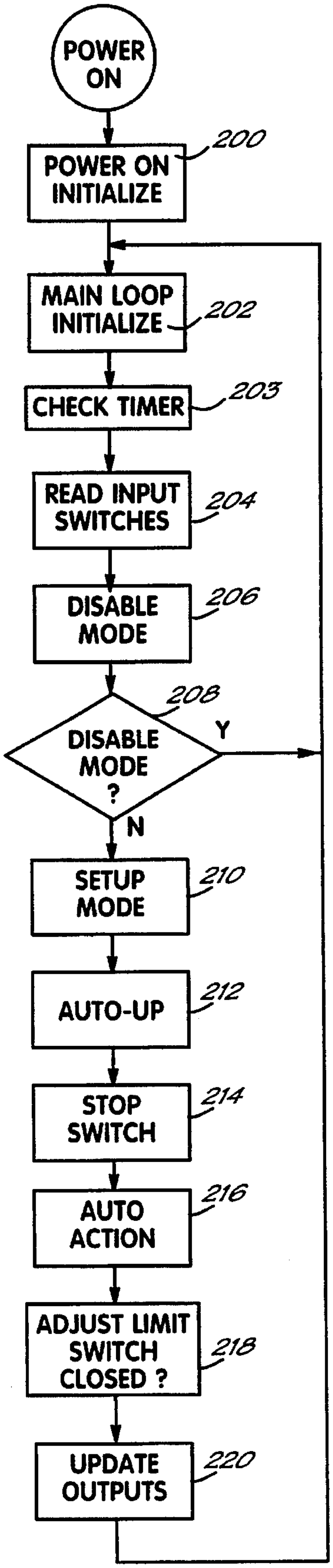
FIG. 6 is a flow chart showing the main routine executed by the microprocessor of the control system shown in FIG. 5 to control the operation of the chair.

Programmable capabilities of the chair control system are shown in FIG. 6 which is a flowchart illustrating the process steps of the main routine executed by the microprocessor 82 of the control circuit 54. The microprocessor 82 starts executing the main routine upon application of power to the control circuit 54. The main routine is iteratively executed at a suitable rate for the particular application. For example, a main routine cycle loop time suitable for debouncing pushbuttons or switches as used with chair 10 is 66 milliseconds. The main loop iterates continuously until the power to the control circuit is turned OFF. The process at step 200 initializes the hardware elements of the system such as the timers 102, the internal registers 103, tone generator 104, etc. Next, the process, at step 202, establishes a set of default parameters for status bits, output registers, etc. The main routine at step 203 executes a check timer subroutine; however, on the first iteration through the main routine, there will be no output signals and no output timers will be running.

Figure 7:
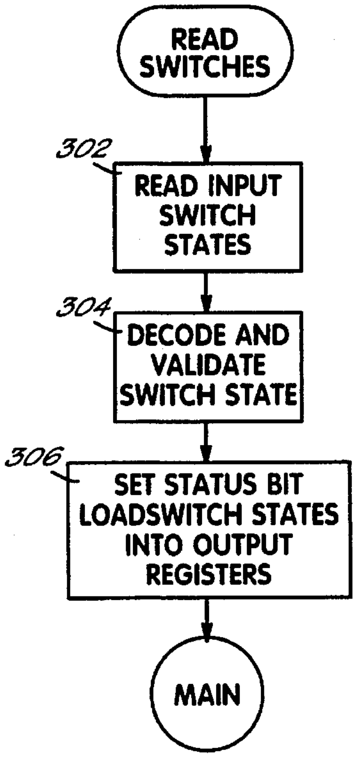
FIG. 7 is a flow chart showing the process steps of the Read Switches subroutine in the main routine of FIG. 6.

The main routine at step 204 executes a read switch subroutine illustrated in FIG. 7. The first step 302 of the read switch routine reads the states of the input switches on the outputs 98 from the optical buffers 100. The states of the membrane switches, the foot switches, the console switches, and the states defined by activating multiple switches are, at process step 304, individually decoded and validated so that only predetermined acceptable combinations of input switch states are recognized. For example, the disable mode is activated by simultaneously actuating one of the stop switches 66, 66*a* and one of the lower base switches 64, 64*a;* and those switches in combination operate as a disable switch. Other switch combinations are decoded and validated to activate and deactivate the "auto up" mode and the "set up" mode.

Thereafter, at process step 306 the decoded and validated switch states are loaded into a command state output register within the group of registers 103; and appropriate status states are set in status registers included within the group of internal registers 103. The status registers are used to track the current state of the chair operation as determined by the operator. For example, status bits may be used to determine whether a maintaining or momentary output has been selected; to determine whether an audible signal is to be given to confirm each switch actuation; to determine whether a decoded switch state was previously decoded; to track the state of the various modes selected by the operator, etc.

The command state output register holds a six bit word the first four bits of which correspond to the desired commanded states of the four output signals on microprocessor output ports connected to lines 108, 110, 112, 114. One or more of the four output signals may be turned ON depending on the input switches actuated. However, the process at step 304 will screen out, that is, not accept, input switch states that are logically inconsistent or undesirable. For example, if the raise back and recline back switches 58*a*, 60*a* are actuated simultaneously, process step 304 will disregard both states, and the current operation of the chair 10 will not be changed. However, if one of the raise back switches, for example, switch 58*a* is actuated closing the contacts within the switch, the state of the closed contacts is recognized by the microprocessor 82, and a bit within the output register is set to a state which will command an output signal from microprocessor 82 to turn ON the chair motor 34. Similarly, if the raise back switch 58a has been programmed to command a momentary output from the microprocessor 82, as explained below, and if the raise back switch contacts are opened during a subsequent iteration through the main routine, the same bit in the output register is reset to its original state and the chair motor 34 will be turned OFF. The subroutine of FIG. 7 reads and operates on all the contact closures and openings of all input switches including switches on membrane switch plates 50, 50a, foot switches 52 and instrument stand or console switches 84.

Figure 8:
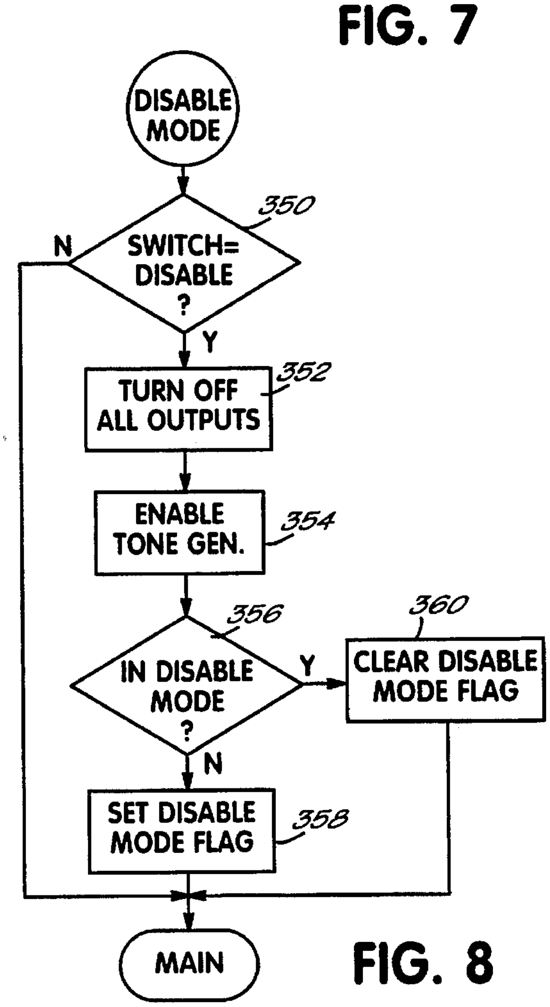
FIG. 8 is a flow chart showing the process steps of the Disable Mode subroutine in the main routine of FIG. 6.

Returning to FIG. 6, the main routine then proceeds at process step 206 to execute a disable mode subroutine the flow chart for which is illustrated in FIG. 8. The process at step 350 detects whether the current decoded and validated input switch states are representative of actuation of a disable switch to activate the disable mode. The disable switch, and hence, the disable mode is activated by a coded input represented by actuation of a combination of two predetermined input switches on either of the membrane switch plates 50, 50a. More specifically, the disable mode is activated by simultaneously holding one of the stop switches 66, 66a depressed and pressing one of the lower seat switches 64, 64a. If a disable switch ON state exists, the process at step 352 turns OFF all output signals by resetting the appropriate bits in the command state output register; and the tone generator 114 is enabled at step 354 to provide an audible signal, for example, a three second beep indicating that the disable mode has been activated. Next, after determining whether the disable mode is currently either deactivated or activated at step 356, the process, respectively, either sets the disable mode flag at step 358 or clears the disable mode flag at step 360. An enable switch is activated to deactivate the disable mode. This switch is activated by a coded input represented by a combination of switches which is preferably the same predetermined combination of switches, e.g., switches 64, 66, used to activate the disable mode. Consequently, the process at steps 356, 358, 360 is effective to toggle in and out of the disable mode in response to successive actuations of the disable and enable switches.

Figure 9:
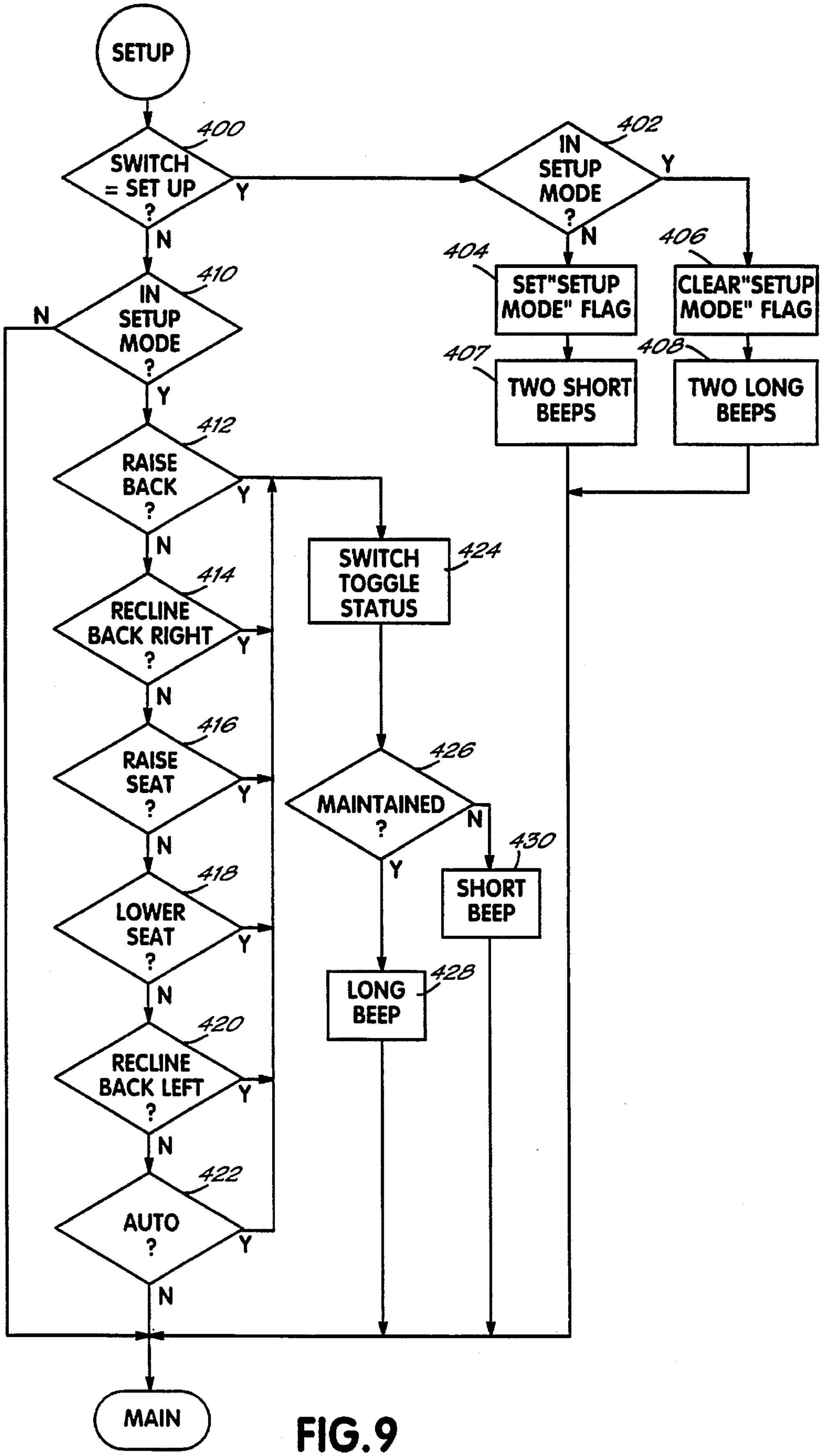
FIG. 9 is a flow chart showing the process steps of the Set-up subroutine in the main routine of FIG. 6.

The process then returns to the main routine of FIG. 6; and at process step 208, detects whether the disable mode is active. If it is, the process immediately returns to the beginning of the main routine at process step 202. Therefore, the main routine will inhibit the control from producing output signals in response to subsequent switch commands until the disable mode is deactivated. If the disable mode is not active, the main routine at process step 210 executes the set up mode subroutine illustrated in FIG. 9. First, the process at step 400 detects whether the current state of the switches decoded and validated is representative of actuation of the set up switch thereby activating the set up mode. The set up switch, and hence, the set up mode is activated by an input switch code invoked by actuating a combination of two predetermined input switches, for example, by holding one of the stop switches 66, 66a and then pressing one of the auto switches 68, 68a on the respective membrane switch plates 50, 50a. If the set up switch is detected, the process at step 402 determines whether the set up mode is currently active. If the set up mode is currently inactive, the process at step 404 sets the set up mode flag. Otherwise, the process clears the set up mode flag at process step 406. Consequently, in steps 402, 404 and 406, the process successively activates and deactivates the set up mode in response to successive actuations of the input switches representing actuation of the set up switch. After setting the set up mode flag, the process at step 407 activates the tone generator to produce two short beeps. If the set up mode flag is cleared, the process at step 408 activates the tone generator to produce two long beeps. Thereafter, the process returns to the main routine of FIG. 6.

The control circuit 54 may be used to produce two types of output signals in response to actuation of respective input switches 58, 60, 62, 64, 58a, 60a, 62a, 64a on membrane switch plates 50, 50a. The microprocessor 82 may be set to produce a maintained output signal that is switched to an ON state, that is turned ON in response to closure of the switch 58, 60, 62, 64, 58a, 60a, 62a, or 64a contacts of an input switch. The maintained output signal is sustained in the ON state independent of the subsequent opening of the input switch contacts. The maintained output signal is reset to an OFF state, that is, turned OFF upon expiration of an output timer within the group of timers 102 which was started when the maintained output signal was turned ON. Alternatively, the microprocessor 82 may be set to produce a momentary output signal that is turned ON in response to closure of the input switch contacts upon actuation of the input switch. The momentary output signal is then turned OFF when the control detects a subsequent opening of the input switch contacts.

If, at process step 400, the set up switch state is not detected, but the process at step 410 detects that the set up mode is activated, the process at step 412 tests whether the current switch states represent contact closures, that is, an active state, for either the raise back switches 58 and 58a, right side recline back switch 60a, raise base switches 62 and 62a, lower base switches 64 and 64a, left side recline back switch 60, or auto switches 68 and 68a on the membrane switch plates 50, 50a. If any of these switches has been actuated to register an active state, the process at step 424 switches the current output signal status bit defining one of the types of output signals to the opposite state. For example, if the current state of the output signal status bit is set to produce a maintained output signal, the status bit is switched so that a momentary output signal will be produced, and vice versa. The process at step 426 detects whether the maintained status bit is active, and if so, operates the tone generator 104 at step 428 to provide an audible signal, for example, a long beep. Conversely, if momentary status is active, the process at step 430 causes the tone generator 104 to emit a different audible signal, for example, a short beep. It should be noted that the left side or assistant's back recline switch 60 and the right side or doctor's back recline switch 60a are independently decoded because they may have different functions as will be described.

The auto switches 68, 68a are used in the set up mode to selectively activate and deactivate a switch beep option by actuation thereof while in the set up mode. When this option is activated, a beep or short tone is generated by the tone generator 104 in response to every input switch contact closure. That beep provides a sensory perceptible signal to the operator that the control recognized a switch contact closure in response to the operator actuating the input switch. Therefore, upon decoding the auto switch, the process at step 424 will toggle a status bit that sets the switch beep option.

Figure 10:
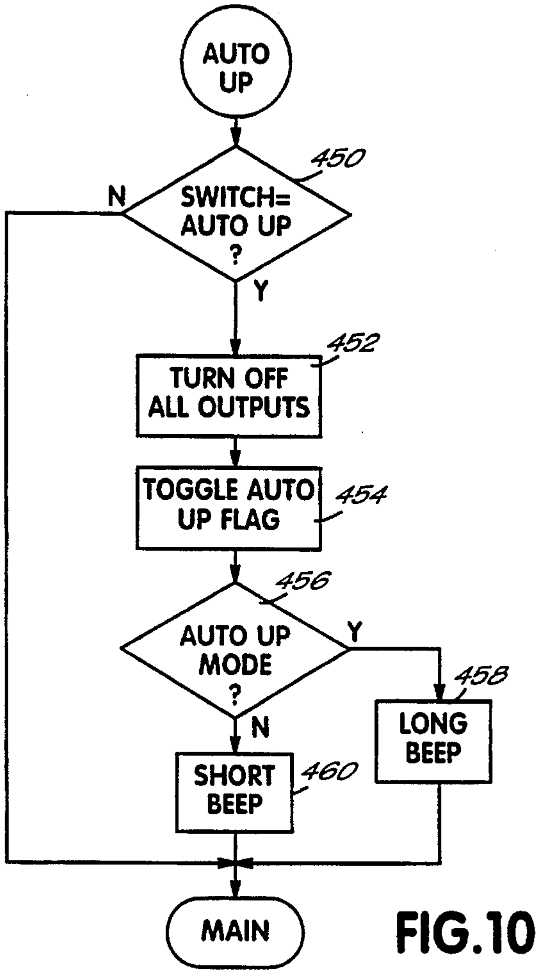
FIG. 10 is a flow chart showing the process steps of the Auto Up subroutine in the main routine of FIG. 6.

Upon returning to the main routine illustrated in FIG. 6, the program next executes an auto up subroutine illustrated at step 212, the details of which are shown in FIG. 10. Referring to FIG. 10 the process at step 450 detects whether the current decoded and validated switch states are representative of the auto up switch thereby activating the auto up mode. The auto up switch, and hence, the auto up mode is activated by an input switch code invoked by actuating a combination of two predetermined switches, for example, by holding one of the stop switches 66, 66*a* and pressing one of the recline back switches 60, 60*a* on either membrane switch plate 50 or 50*a*. If states of the input switches represent the auto up switch, the process first at step 452 turns OFF all of the output signals by switching the states of the appropriate bits in the command state output register to the OFF state. Next, the process at step 454 toggles the auto up mode flag thereby successively activating and deactivating the auto up mode flag with each iteration of the auto up subroutine in response to successive actuations of the auto up switch. If the process at step 454 sets the auto-up mode flag as detected at process step 456, the tone generator 104 at step 458 is operated to produce an audible signal, for example, a long beep. If the auto up mode is reset, the tone generator 104 at process step 460 is operated to produce a different audible signal, for example, a short beep.

Figure 11:
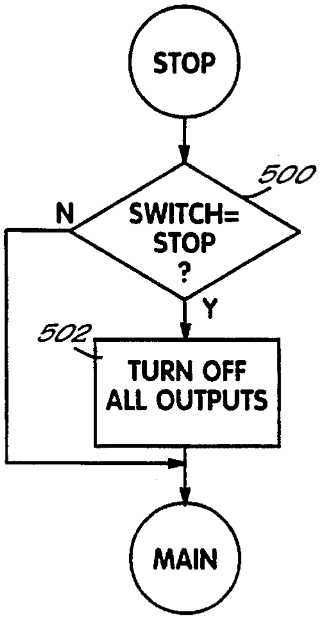
FIG. 11 is a flow chart showing the process steps of the Stop Switch subroutine in the main routine of FIG. 6.

Thereafter, the program returns to the main routine illustrated in FIG. 6 and the process at step 214 detects whether a stop switch 66, 66*a* is closed. By executing the stop switch subroutine illustrated in FIG. 11, the process at step 500 detects whether the current state of the decoded and validated switches represents actuation of a stop switch. If so, the process at step 502 switches the bits in the command state output register corresponding to the output signals on lines 108, 110, 112, 114 to their OFF state.

Figure 12:
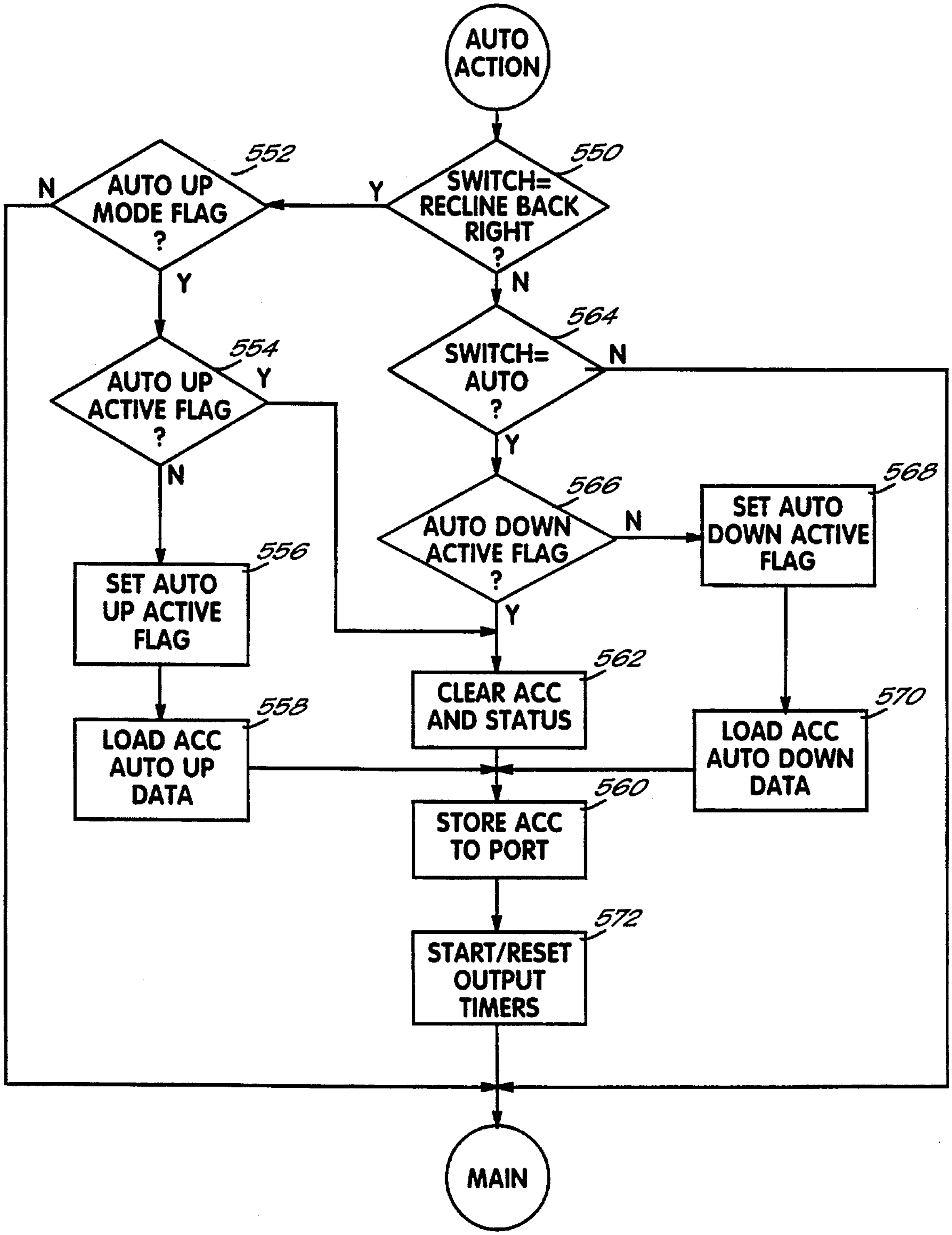
FIG. 12 is a flow chart showing the process steps of the Auto Action subroutine in the main routine of FIG. 6.

Returning to the main program of FIG. 6, the process at step 216 executes the auto action subroutine shown in detail in FIG. 12. First the process at step 550 determines whether the current decoded and validated input switch state represents a closure of the right side recline back switch 60*a* on switch plate 50*a*. Although switches on either side of the chair on the membrane switch plates 50, 50*a* may be used to invoke the auto up mode, only the right side or doctor's recline back switch 60*a* on membrane switch plate 50*a* is used to actuate auto up motion of chair 10. Therefore, the left side or assistant's recline back switch 60 on switch plate 50 can be used to activate the normal recline back motion in either a maintaining or momentary fashion as previously described. If the right side recline back switch 60*a* is closed, the process at step 552 determines whether the auto up mode flag is set. If so, the process at step 554 tests whether the auto up active flag is set. If not, the process sets the auto up active flag at step 556 and at step 558 the auto up data is loaded into an accumulator register. The auto up data represents a command to actuate chair motor 34 in one direction and cause the pump and motor assembly 20 to simultaneously raise the seat 12 and recline the back 14 and apron 16 (FIG. 2). The auto up data is then transferred from the accumulator to the output ports of the microprocessor 82 pursuant to step 560. Transferring the auto up data to the output ports of the microprocessor 82 will turn ON raise seat and recline back output signals on lines 112 and 110, respectively.

If the process at step 554 detects that the auto up active flag is set, the process at step 562 clears or resets the contents of the accumulator register and the appropriate status bits. Thereafter, at step 560, the states of the reset accumulator register are stored to the output ports of the microprocessor 82 thereby turning the raise seat and recline back output signals OFF. The net effect of the process in steps 550 through 562 and the use of the auto up active flag is to toggle the auto up motion ON and OFF in response to successive actuations of recline back switch 60*a* when in the auto up mode.

If at process step 550 the right side recline back 60*a* switch is not actuated, the process at step 564 checks whether the auto switch on either of the membrane switch plates 50, 50*a* has been actuated. If so, at step 566, the process tests to determine whether the auto down active flag is set. If not, at step 568 the auto down active flag is set; and at process set 570, the auto down data is loaded into an accumulator. The auto down data is transferred to the output ports of the microprocessor 82 at process step 560 turns ON the output signals from the microprocessor 82 to actuate chair motor 34 and pump and motor assembly 20 so as to raise the back 14, retract apron 16 and lower the seat 12 (FIG. 1).

Whether in the auto up mode or responding to one of the auto switches 68*a* which return the chair to the entry/exit position shown in FIG. 1, each time data is transferred to an output port of the microprocessor 82 that turns an output signal ON or OFF, the process at step 572 starts or resets, respectively, an output timer associated with that output signal. Typically, the output timers are set to time a 15 second duration. During subsequent iterations through the main routine, a check timer subroutine is executed which detects the expiration of the 15 second period, and thereafter, turns OFF the appropriate output signal.

Figure 13:
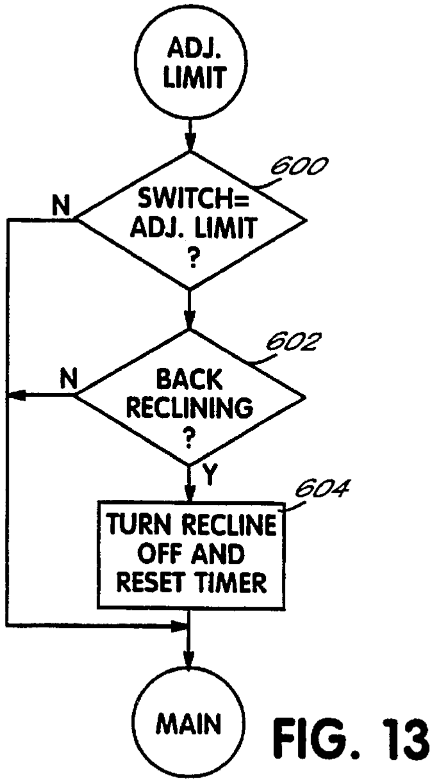

Returning to the main program of FIG. 6, the program at step 218 determines the state of the adjustable limit switch 43 by executing the subroutine shown in FIG. 13. The subroutine at step 600 detects whether the decoded and validated current state of the input switch is representative of closure of the adjustable limit switch 43. If so, the process at step 602 detects whether the back 14 and apron 16 are respectively reclining and extending, That may be done by testing the state of the appropriate bit in the command state output register or by other means, If the back 14 and apron 16 are respectively reclining and extending, the subroutine at process 604 turns OFF the back recline output signal. Therefore, the adjustable limit switch 43 is effective to stop motion when the back 14 is reclining and apron 16 is extending in response to an actuation of a back recline switch independent of whether the auto up mode is active. Adjustable limit switch 43 may be disabled by being disconnected or unplugged from its input to the control circuit 54 (FIG. 5).

Figure 14:
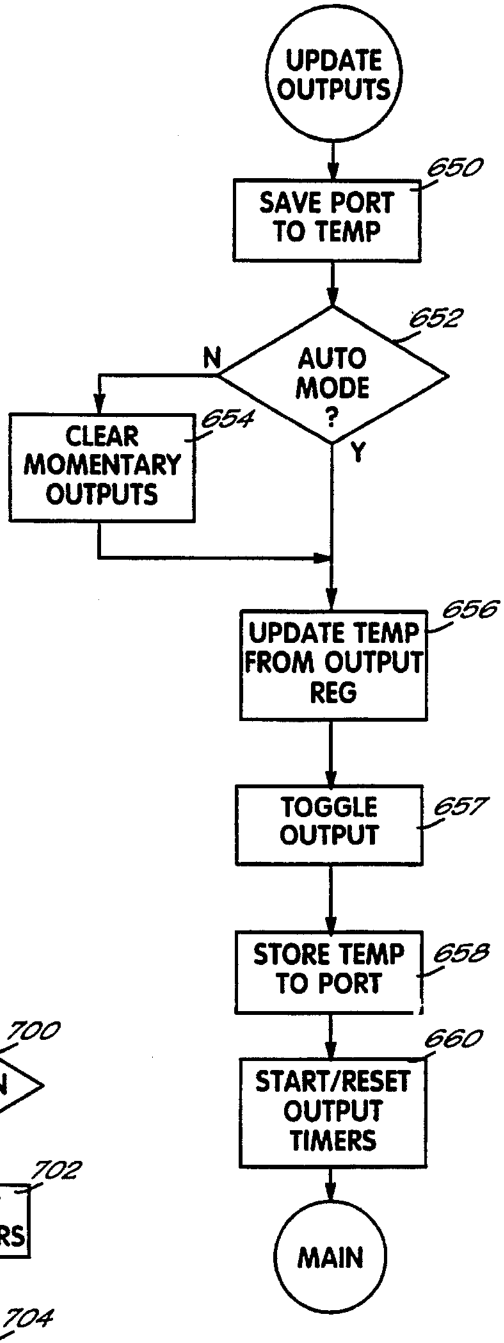
FIG. 14 is a flow chart showing the process steps of the Update Outputs in the main routine of FIG. 6; and, FIG. 15 is a flow chart showing the process steps of the Check Timer subroutine in the main routine of FIG. 6.

Returning to FIG. 6, the main routine at step 220 executes an update output subroutine which is effective to update the output signals from the microprocessor 82. Referring to FIG. 14, the process at step 650 first saves the current states of the output ports of the microprocessor to a temp register. Next, at step 652, the process checks whether the auto up active flag or the auto down active flag is set. If the process is executing either one of the auto modes, the output signals must be maintained. However, if neither of the auto modes is active, the process at step 654 uses the status bits associated with each microprocessor output to clear or reset the state of the appropriate output bit in the temp register if the status bit represents a momentary output. At process step 656, the output states in the temp register are then updated based on the current states of corresponding bits in the command state output register which have been set by the read switch subroutine of FIG. 7 and other process operations. Data is either added or replaced depending on the contents of the command state output register and other status information. At step 657, the process toggles the output state of a command signal if a repetition of an actuation of the switch is detected. Therefore, if a switch set to provide a maintained output is inadvertently actuated, and chair motion is initiated. That chair motion can be stopped by actuating the switch again. In addition, different chair motions can be easily "jogged" by repetitive actuations of a single switch. Consequently, process step 657 requires that the process detect and store a switch contact closure and subsequent contact opening. If another contact closure is detected, the maintained output state is toggled to its opposite state.

Figure 15:
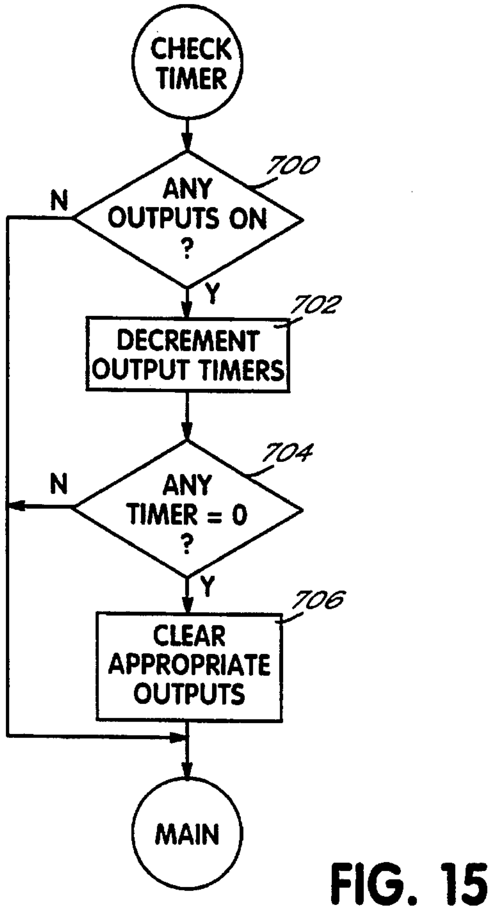

The updated contents of the temp register are then transferred or stored to the output ports of the microprocessor pursuant to step 658. Thereafter the process at step 660 will start the 15 second output timers associated with output ports that have been turned ON and stop and reset the output timers associated with output ports that have been turned OFF. During subsequent iterations through the main routine, the check timer subroutine at process step 203 is executed. Referring to FIG. 15, the process at step 700 first checks to determine whether any outputs from the microprocessor 82 are turned ON. If so, the timer associated with each of those outputs is decremented pursuant to step 702; and at step 704, the process tests each timer to determine whether the preset 15 second time duration has expired. If so, at step 706, the process clears or resets the appropriate output by resetting the appropriate bit corresponding to that output in the command state output register. It should be noted that the output timers are turned ON with momentary output signals and will turn OFF momentary switches if the switch remains actuated for the timer duration, for example, 15 seconds.

In use, if, for example, the recline back switch **60*a* is pushed, a microprocessor output port connected to line 110 is turned ON which provides an output signal to recline back relay 118. Recline back relay 116 provides a high voltage signal over line 124 and through recline back limit switch 130 to chair motor 34, thereby causing chair motor 34 to turn ON in a direction that reclines the back 14 and extends the apron 16. When the output port is turned ON, one of the 15 second output timers in the group of timers 102 is started. If the recline back switch 60*a* is set to produce a momentary output from the microprocessor 82 and switch 60*a* is released, the microprocessor output port is turned OFF which terminates the output signal on line 110 and turns OFF the chair motor 34**, thereby stopping the reclining motion of the back. In addition, when the output port is turned OFF, the timer that was started when the output port was turned ON is stopped and reset.

If, instead of being released, the recline back switch **60*a* is held depressed, the chair motor 34 continues to operate; and the chair back 14 and apron 16 continue to recline and extend until the adjustable limit switch 43 is actuated. The microprocessor output port connected to line 110 is turned OFF in response to the actuation of the adjustable limit switch 43; the chair motor 34 is turned OFF; and chair reclining motion stops. If the adjustable limit switch 43 is not being used, power to run the chair motor 34 in the direction reclining the chair back 14 and extending apron 16 is interrupted when the chair moves to a position such that recline back limit switch 130 is actuated. The chair motor 34 cannot be run in the direction producing a back recline motion until the chair back 14 is raised so that the limit switch 130 is not actuated. Further, the output timer that was started when the output port was first turned ON continues to run while the recline back switch 60*a* is being held depressed and the output port remains ON. After 15 seconds, the output timer times out which causes the output port connected to line 110 to be turned OFF, thereby terminating the output signal to the recline back relay 118 and stopping the chair motor 34** if it still running.

If the recline back switch **60*a* is set to produce a maintained output signal from the microprocessor 82 or the auto up mode is selected, pushing the recline back switch 60*a* will turn ON the microprocessor output port connected to line 110 which starts a 15 second output timer and turns the chair motor 34 ON in a direction to recline the back 14 and extend apron 16. However, the microprocessor output port connected to line 110 will remain ON, and the output timer will continue its timing operation in response to a subsequent release of the recline back switch 60*a*. Consequently, the chair motor 34 will continue to recline the back 14 and extend apron 16 until adjustable limit switch 43 is actuated which turns OFF the microprocessor output port and the chair motor 34, thereby stopping motion of the chair. If the adjustable limit switch 43 is not being used, power to run the chair motor 34 in the direction reclining the chair is interrupted when a reclined position is reached that actuates the recline back limit switch 130. As previously described, after 15 seconds, the timer which was started when the output port was turned ON times out and causes the output port connected to line 110 to be turned OFF, thereby terminating the output signal to the recline back relay 118 and stopping the chair motor 34** if it still running.

If, as just described, the recline back switch **60*a* is set to produce a maintained output signal from the microprocessor 82 or the auto up mode is selected, pushing the recline back switch 60*a* will turn ON the microprocessor output port connected to line 110 which starts the chair motor 34 in a direction to recline the back 14 and extend apron 16. If the recline back switch 60*a* is released and then subsequently pressed, the microprocessor output port connected to line 110 will be turned OFF, thereby stopping the chair motor 34 and motion of the chair. Successive depressions of the recline back switch 60*a*** will start and stop chair motion.

While the invention has been set forth by a description of a preferred embodiment in considerable detail, it is not intended to restrict or in any way limit the claims to such details. Additional advantages and modifications will readily appear to those who are skilled in the art. For example, other switch constructions or combinations and locations with respect to the chair may be utilized. The functions of the switches located in association with the foot switches 52 and instrument stand switches 84 may be varied. Further, since the microprocessor has the capability of detecting contact closures and openings of each of the individual switches regardless of their location and function, there is great flexibility in providing a coded switch input to the control for invoking different modes of operation. In the described embodiment, only the switches on the membrane switch plates 50, **50*a* are utilized to invoke the different set up and operating modes as well as have the capability of selectively providing momentary and maintained output signals. It is a matter of design choice to utilize any of the foot switches or instrument stand switches, as appropriate, to invoke the set up and operating modes described herein. Similarly, the back recline switch on the membrane switch plate 50*a* is used to move the chair in the auto up mode. Alternately, the back recline switch on the membrane switch plate 50**, or any other switch, may be used to move the chair in the auto up mode.

The shapes and icon designs on the membrane switch plates is a matter of design choice. Similarly, the use of backlighting and embossing the switches is equally a matter of design choice. In the described embodiment, the set up and operating modes are invoked by first holding the stop switch on either of the membrane switch plates 50, **50*a***. The stop switch is selected as the first switch required to invoke the mode so that a stop is decoded and outputs are turned OFF as part of activating of the various modes. Alternatively, the modes may be invoked by using a separate switch, by using different combinations of switches, by holding a switch depressed for a predetermined period of time, or by other control mechanisms known to those skilled in the art. Further, a sensory perceptible audible indicator of switch actuations and mode activations is disclosed. Alternatively, it is within the scope of the claimed invention to utilize other sensory perceptible indicators such as lights of different color, lights that turn on for different durations of time, or lights that flash in predetermined coded patterns.

It is well within the skill of those in the art to utilize the process steps described in the flow charts wherein to create coded instructions for the identified microprocessor or a comparable control mechanism. It is understood that other microprocessors and control elements may be used that respond to the actuation of the input switches and provide the same out put signals as described herein. The invention in its broadest aspects is therefore not limited to the specific details shown and described. Accordingly, departures may be made from such details without departing from the spirit and scope of the invention.

I claim:

1. A powered adjustable chair comprising:

a seat connected to a base for vertical movement with respect thereto and having a surface for supporting a patient;

a back forming part of said chair and secured proximate one edge of said seat, said back having a surface for supporting a patient;

a powered motion mechanism operatively connected to at least one of said seat and said back;

a first power supply connected to said powered motion mechanism for supplying power thereto at a first predetermined voltage;

a control electrically coupled to said powered motion mechanism for controlling the operation thereof, said control including a switch plate operatively connected to a microprocessor, said switch plate including a plurality of flat, tactile-feel membrane switches each including a flat outer surface exposed on an outside surface of said seat back for allowing an operator to directly depress said flat outer surface and direct the operation of said control and to thereby also direct desired powered movement of said chair; and, a second power supply connected to said control for supplying power to said control including said membrane switches at a second predetermined voltage which is less than said first predetermined voltage.

2. The chair of claim 1 wherein said powered motion mechanism comprises a power lift mechanism operatively connected to said seat for vertically raising and lowering said seat and back.

3. The chair of claim 2 wherein said back is pivotal with respect to said seat and further comprising a power recline mechanism operatively connected to said back for moving said back angularly with respect to said seat.

4. The chair of claim 3 wherein said microprocessor selectively provides alternative maintained and momentary output signals in response to actuation of one of said plurality of membrane switches, said maintained output signal defined as being set to an ON state in response to closing contacts in said one switch and said maintained output signal being sustained ON independent of the contacts of said one switch opening, said momentary output signal defined as being set to an ON state in response to closing contacts in said one switch, said momentary output signal being reset to an OFF state in response to the contacts of said one switch opening.

5. The chair of claim 4 wherein said control further includes means for selectively activating and deactivating an auto up mode, wherein when said auto up mode is activated a maintained auto up output signal is set to an ON state in response to actuation of a predetermined switch so as to cause said power lift mechanism and said power recline mechanism to raise and recline said chair to a predetermined position, and wherein said predetermined switch sets one of said maintained and momentary output signals to an ON state upon actuation thereof after deactivation of said auto up mode.

6. The chair of claim 3 wherein said control further includes means for selectively activating and deactivating an auto up mode, wherein when said auto up mode is activated a maintained auto up output signal is set to an ON state in response to actuation of a predetermined switch to cause said power lift mechanism and said power recline mechanism to raise and recline said chair to a predetermined position, and wherein upon deactivation of said auto up mode one of a maintained and a momentary output signal is set to an ON state in response to actuation of said predetermined switch.

7. The chair of claim 1 wherein said back is pivotal with respect to said seat and said powered motion mechanism comprises a power recline mechanism operatively connected to said back for moving said back angularly with respect to said seat.

8. The chair of claim 1 wherein said switch plate is located on a side edge of said seat back.

9. The chair of claim 1 wherein a switch plate is located on each of two opposite side edges of said seat back.

10. The chair of claim 1 wherein said microprocessor selectively provides alternative maintained and momentary output signals in response to actuation of one of said plurality of membrane switches, said maintained output signal defined as being set to an ON state in response to closing contacts in said one switch and said maintained output signal being sustained ON independent of the contacts of said one switch opening, said momentary output signal defined as being set to an ON state in response to closing contacts in said one switch, said momentary output signal being reset to an OFF state in response to the contacts of said one switch opening.

11. The chair of claim 1 wherein said control further includes a control circuit responsive to an actuation of a disable switch and operative to selectively disable said switches on said switch plate from directing movement of said chair while power is maintained to said control.

12. The chair of claim 11 wherein said disable switch comprises a predetermined combination of switches on said switch plate.

13. The chair of claim 12 wherein said control further includes an enable switch for selectively enabling operation of said switches on said switch plate to direct movement of said chair, and wherein said enable switch comprises said predetermined combination of switches.

14. The chair of claim 1 wherein said flat, tactile feel membrane switches each further comprise a first contact and a second dome-shaped contact, wherein said dome-shaped contact may be depressed into said first contact to cause switch actuation.

15. A powered adjustable chair comprising:

a seat connected to a base for vertical movement with respect thereto and having a surface for supporting a patient;

a back forming Dart of said chair and secured proximate one edge of said seat, said back having a surface for supporting a patient;

a powered motion mechanism operatively connected to at least one of said seat and said back; and, a control electrically coupled to said powered motion mechanism for controlling the operation thereof, said control including a plurality of switches operatively connected to a microprocessor for allowing an operator to direct the operation of said powered motion mechanism, said microprocessor selectively providing alternative maintained and momentary output signals in response to actuation of one of said plurality of switches, said maintained output signal defined as being set to an ON state in response to closing contacts in said one switch and said maintained output signal being sustained ON independent of the contacts of said one switch opening, said momentary output signal defined as being set to an ON state in response to closing contacts in said one switch, said momentary output signal being reset to an OFF state in response to the contacts of said one switch opening.

16. The chair of claim 15 wherein said powered motion mechanism comprises a power lift mechanism operatively connected to said seat for vertically raising and lowering said seat and back.

17. The chair of claim 16 wherein said back is pivotal with respect to said seat further comprising a power recline mechanism operatively connected to said back for moving said back angularly with respect to said seat.

18. The chair of claim 17 wherein said control further includes means for selectively activating and deactivating an auto up mode, wherein when said auto up mode is activated a maintained auto up output signal is set to an ON state in response to actuation of a predetermined switch so as to cause said power lift mechanism and said power recline mechanism to raise and recline said chair to a predetermined position, and wherein said predetermined switch sets one of said maintained and momentary output signals to an ON state upon actuation thereof after deactivation of said auto up mode.

19. The chair of claim 15 wherein said control further includes a control circuit responsive to an actuation of a disable switch and operative to selectively disable said plurality of switches from directing movement of said chair while power is maintained to said control.

20. The chair of claim 19 wherein said disable switch comprises a predetermined combination of said plurality of switches.

21. The chair of claim 20 wherein said control further includes an enable switch for selectively enabling operation of said plurality of switches to direct movement of said chair, and wherein said enable switch comprises said predetermined combination of said plurality of switches.

22. A powered adjustable chair comprising:

a seat connected to a base for vertical movement with respect thereto and having a surface for supporting a patient;

a back forming part of said chair and secured proximate one edge of said seat, said back having a surface for supporting a patient;

a powered motion mechanism operatively connected to at least one of said seat and said back; and, a control electrically coupled to said powered motion mechanism for controlling the operation thereof, said control including a plurality of switches operatively connected to a microprocessor for allowing an operator to direct the operation of said powered motion mechanism, said control further including means for selectively activating and deactivating an auto up mode, wherein when said auto up mode is activated said microprocessor sets a maintained auto up output signal to an ON state in response to actuation of a predetermined switch so as to cause said powered motion mechanism to move said chair to a raised, operating position, and wherein upon deactivation of said auto up mode one of a maintained and a momentary output signal is set to an ON state in response to actuation of said predetermined switch.

23. The chair of claim 22 wherein said powered motion mechanism comprises a power lift mechanism operatively connected to said seat for vertically raising and lowering said seat and back.

24. The chair of claim 23 wherein said back is pivotal with respect to said seat and further comprising a power recline mechanism operatively connected to said back for moving said back angularly with respect to said seat and wherein said maintained auto up output signal causes said power lift mechanism and said power recline mechanism to respectively raise and recline said chair to said raised, operating position.

25. The chair of claim 22 wherein said control further includes a control circuit responsive to an actuation of a disable switch and operative to selectively disable said plurality of switches from directing movement of said chair while power is maintained to said control.

26. The chair of claim 25 wherein said disable switch comprises a predetermined combination of said plurality of switches.

27. The chair of claim 26 wherein said control further includes an enable switch for selectively enabling operation of said plurality of switches to direct movement of said chair, and wherein said enable switch comprises said predetermined combination of said plurality of switches.

28. A powered adjustable chair comprising:

a seat connected to a base for vertical movement with respect thereto and having a surface for supporting a patient;

a back forming part of said chair and secured proximate one edge of said seat, said back having a surface for supporting a patient;

a powered motion mechanism operatively connected to at least one of said seat and said back; and, a control electrically coupled to said powered motion mechanism for controlling the operation thereof, said control including a plurality of switches operatively connected to a microprocessor for allowing an operator to direct the operation of said powered motion mechanism, said control further including a control circuit responsive to an actuation of a disable switch and operative to selectively disable said plurality of switches from directing movement of said chair while power is maintained to said control.

29. The chair of claim 28 wherein said disable switch comprises a predetermined combination of said plurality of switches.

30. The chair of claim 29 wherein said control further includes an enable switch for selectively enabling operation of said plurality of switches to direct movement of said chair, and wherein said enable switch comprises said predetermined combination of said plurality of switches.

31. A powered adjustable chair comprising:

a seat connected to a base for vertical movement with respect thereto and having a surface for supporting a patient;

a back forming part of said chair and secured proximate one edge of said seat, said back having a surface for supporting a patient;

a powered motion mechanism operatively connected to at least one of said seat and said back; and, a control electrically coupled to said powered motion mechanism for controlling the operation thereof, said control including a plurality of switches operatively connected to a microprocessor for allowing an operator to direct the operation of said powered motion mechanism, said control including a beep on control circuit including a tone generator responsive to an actuation of at least one of said switches to produce an audible tone indicating contact closure of said at least one switch, said control further including a beep on switch operative to selectively activate and deactivate said beep on control circuit.

32. A method of operating a powered adjustable chair including a control electrically coupled to said chair for controlling movement thereof, said control including a microprocessor electrically coupled to a plurality of switches, said microprocessor selectively providing alternative first and second output signals in response to actuation of one of said plurality of switches, said first output signal being a maintained output signal that is set to an ON state in response to closing contacts in said one switch and is maintained ON independent of said contacts in said one switch opening, said second output signal being a momentary output signal that is set to an ON state in response to closing contacts in said one switch and is reset to an OFF state in response to the contacts of said one switch opening, the method comprising the steps of:

activating one of said first and second output signals from said microprocessor to one of said switches; and, actuating said one switch to move said chair to a desired position.

33. The method of claim 32 wherein said step of activating one of said first and second output signals comprises actuating a first predetermined combination of said switches.

34. The method of claim 33 wherein the step of activating a predetermined combination of switches further comprises the steps of:

entering a setup mode of operation which disables said microprocessor from producing said first and second output signals upon actuation of any one of said plurality of switches; and, actuating a selected switch to activate one of said first and second output signals.

35. The method of claim 34 wherein the step of entering the setup mode further comprises the step of actuating a second predetermined combination of switches.

36. The method of claim 35 wherein the method further comprises the steps of:

providing a first sensory perceptible indicator in response to selecting said one of said first and second output signals; and, exiting said setup mode of operation after activating a desired one of said first and second output signals such that actuation of said selected switch causes said microprocessor to set said one of said first and second output signals to an ON state.

37. The method of claim 36 further comprising the step of:

providing a second sensory perceptible indicator in response to selecting the other of said first and second output signals, wherein said second indicator is perceptibly different from said first indicator.

38. The method of claim 37 wherein the steps of providing first and second sensory perceptible indicators further comprise providing perceptibly different audible tones.

39. The method of claim 38 wherein said perceptibly different audible tones are tones of different duration.

40. The method of claim 36 wherein the step of deactivating the setup mode further comprises the step of actuating a third predetermined combination of switches.

41. The method of claim 40 wherein actuating said second and third predetermined combinations of switches further comprises actuating the same combination of switches.

42. A method of disabling the operation of a powered adjustable chair operated by a plurality of switches connected to a control, at least some of said plurality of switches functioning to cause output signals to be produced from the control in response to actuation thereof whereby said output signals activate a powered motion mechanism to move said chair, the method comprising the steps of:

actuating a first combination of predetermined switches of said plurality of switches to activate a disable mode;

detecting the activation of said disable mode; and, preventing the control from producing said output signals in response to actuation of any of said plurality of switches while power is maintained to said control.

43. The method of claim 42 further comprising the steps of:

actuating a second combination of predetermined switches to deactivate said disable mode;

detecting the deactivation of said disable mode; and, permitting the control to produce said output signals in response to actuation of at least some of said plurality of switches.

44. The method of claim 43 wherein actuating said first and second combinations of predetermined switches further comprises actuating the same combination of switches.

45. The method of claim 42 further comprising the step of:

setting all of said output signals to an OFF state in response to actuation of said first combination of switches.

46. A method of operating a powered adjustable chair comprising a vertically adjustable seat secured to a base and an angularly adjustable back secured proximate one edge of said seat, and a control including a microprocessor electrically coupled to power lift and recline mechanisms of said chair for controlling lifting and reclining of said chair, said microprocess selectively providing alternative first and second output signals in response to actuation of one of a plurality of input switches electrically coupled to said control, wherein said first output signal is set to an ON state in response to closing contacts in said one input switch to thereby cause a first predetermined movement of at least one of said seat and said back, and said second output signal is a maintained auto up output signal that is set to an ON state in response to closing contacts in said one input switch to thereby cause a raising and reclining movement of said chair which is different from said first predetermined movement, the method comprising the steps of:

storing one of said first and said second output signals in said microprocessor; and, setting said one of said first and said second output signals to an ON state by actuating said one input switch to thereby move said chair in a corresponding one of said first predetermined movement and said raising and reclining movement.

47. The method of claim 46 wherein the step of storing one of said first and second output signals comprises actuating a predetermined combination of input switches.

48. The method of claim 47 wherein said one input switch is a switch which causes said back to recline with respect to said base when said first output signal is provided by said microprocessor.

* * * * *

UNITED STATES PATENT AND TRADEMARK OFFICE
CERTIFICATE OF CORRECTION

PATENT NO. : 5,467,002
APPLICATION NO. : 90/009608
DATED : November 14, 1995
INVENTOR(S) : David M. Brooks It is certified that error appears in the above-identified patent and that said Letters Patent is hereby corrected as shown below:

Col. 1, Line 29 - Col. 2, Line 18, Claim 13: delete as follows:

"13. [The chair of claim 12] *A powered adjustable chair comprising:*

*a seat connected to a base for vertical movement with respect thereto and having a surface for supporting a patient;*

*a back forming part of said chair and secured proximate one edge of said seat, said back having a surface for supporting a patient;*

*a powered motion mechanism operatively connected to at least one of said seat and said back;*

*a first power supply connected to said powered motion mechanism for supplying power thereto at a first predetermined voltage;*

*a control electrically coupled to said powered motion mechanism for controlling the operation thereof, said control including a switch plate operatively connected to a microprocessor, said switch plate including a plurality of flat, tactile-feel membrane switches each including a flat outer surface exposed on an outside surface of said seat back for allowing an operator to directly depress said flat outer surface and direct the operation of said control and to thereby also direct desired powered movement of said chair; and,*

*a second power supply connected to said control for supplying power to said control including said membrane switches at a second predetermined voltage which is less than said first predetermined voltage,*

*wherein said control further includes a control circuit*

Signed and Sealed this
Twenty-eighth Day of June, 2011

David J. Kappos
*Director of the United States Patent and Trademark Office*

*responsive to an actuation of a disable switch and operative to selectively disable said switches on said switch plate from directing movement of said chair while power is maintained to said control, said disable switch comprises a predetermined combination of switches on said plate, and* wherein said control further includes an enable switch for selectively enabling operation of said switches on said switch plate to direct movement of said chair, and wherein said enable switch comprises said predetermined combination of switches."

should read:

--13. The chair of claim 12 wherein said control further includes an enable switch for selectively enabling operation of said switches on said switch plate to direct movement of said chair, and wherein said enable switch comprises said predetermined combination of switches.--

US005467002C1

(12) EX PARTE REEXAMINATION CERTIFICATE (6837th)

United States Patent

Brooks

(10) Number: US 5,467,002 C1

(45) Certificate Issued: May 26, 2009

(54) ADJUSTABLE CHAIR HAVING PROGRAMMABLE CONTROL SWITCHES

(75) Inventor: David M. Brooks, Cincinnati, OH (US)

(73) Assignee: Reliance Medical Products, Inc., Mason, OH (US)

Reexamination Request:
No. 90/010,023, Sep. 7, 2007

Reexamination Certificate for:

| | |
|---|---|
| Patent No.: | **5,467,002** |
| Issued: | **Nov. 14, 1995** |
| Appl. No.: | **08/147,941** |
| Filed: | **Nov. 5, 1993** |

(51) Int. Cl.
*A61G 15/00* (2006.01)
*A61G 15/02* (2006.01)

(52) U.S. Cl. ........................ 318/553; 318/280; 318/446; 318/560; 297/330

(58) Field of Classification Search .................. 318/553
See application file for complete search history.

(56) References Cited

U.S. PATENT DOCUMENTS 4,463,234 A * 7/1984 Bennewitz .................. 200/516
4,792,186 A 12/1988 Benjamin et al.
4,916,275 A * 4/1990 Almond ...................... 200/516
5,214,360 A 5/1993 Gonser et al.
5,340,953 A 8/1994 Krebs et al.

OTHER PUBLICATIONS

Brochure of Healthco "Aristocrat Deluxe" Dental Chair, as early as 1989.
Advertisement for "Euro–Crusader", by Schein, Dental Products Report, Sep. 1991.
Healthco International Brochure of "The Celebrity Dental Chair", 1987.
Brochure of PM 2002 CC, Planmeca Oy, 1981.

* cited by examiner

*Primary Examiner*—Albert J Gagliardi

(57) ABSTRACT

An adjustable chair including a control system based around a microprocessor and operated by way of switches preferably located on each side of the seat back. The switches are low voltage flat membrane switches by which the operator moves the chair to a desired position. The switches present a low voltage and sterile environment for both the operator and the patient. The switches can also be easily programmed by the operator to act either in a "momentary" fashion to cause movement of the chair only as long as they are depressed or in a "maintaining" fashion whereby a single depression of a switch causes selected movement of the chair until such movement is stopped by, for example, a limit switch. In addition, one of the switches can also easily be programmed by the operator to alternatively act as either a recline switch or an "auto up" switch. The auto up switch causes the chair to assume a raised and reclined position suitable for performing a specific medical procedure. The control system of the present invention further provides a switch disable feature which allows the operator to easily program the system to disable the switches thereby preventing unauthorized, potentially dangerous or damaging operation of the chair. A selectively operable switch beep on feature is also disclosed.

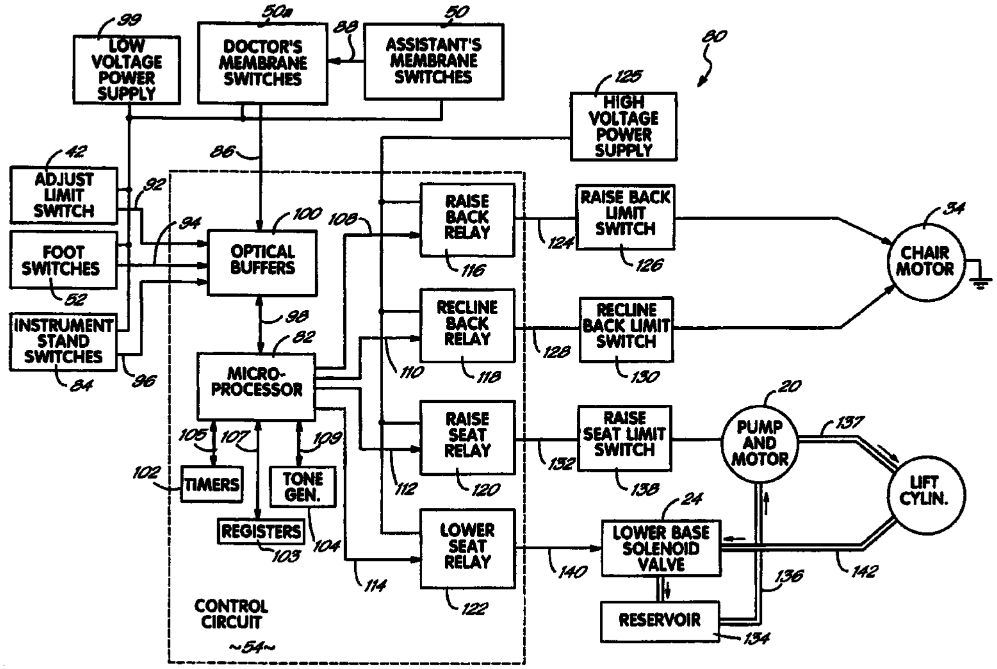

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 11 is cancelled.

Claims 1 and 12 are determined to be patentable as amended.

Claims 2–10 and 13–14, dependent on an amended claim, are determined to be patentable.

1. A powered adjustable chair comprising:

a seat connected to a base for vertical movement with respect thereto and having a surface for supporting a patient;

a back forming part of said chair and secured proximate one edge of said seat, said back having a surface for supporting a patient;

a powered motion mechanism operatively connected to at least one of said seat and said back;

a first power supply connected to said powered motion mechanism for supplying power thereto at a first predetermined voltage;

a control electrically coupled to said powered motion mechanism for controlling the operation thereof, said control including a switch plate operatively connected to a microprocessor, said switch plate including a plurality of flat, tactile-feel membrane switches each including a flat outer surface exposed on an outside surface of said seat back for allowing an operator to directly depress said flat outer surface and direct the operation of said control and to thereby also direct desired powered movement of said chair; and, a second power supply connected to said control for supplying power to said control including said membrane switches at a second predetermined voltage which is less than said first predetermined voltage*,*

*wherein said control further includes a control circuit responsive to an actuation of a disable switch and operative to selectively disable said switches on said switch plate from directing movement of said chair while power is maintained to said control.*

12. The chair of claim [11] *1* wherein said disable switch comprises a predetermined combination of switches on said switch plate.

* * * * *

US005467002C2

(12) EX PARTE REEXAMINATION CERTIFICATE (8251st)

United States Patent
Brooks

(10) Number: US 5,467,002 C2
(45) Certificate Issued: May 17, 2011

(54) ADJUSTABLE CHAIR HAVING PROGRAMMABLE CONTROL SWITCHES

(75) Inventor: David M. Brooks, Cincinnati, OH (US)

(73) Assignee: Reliance Medical Products, Inc., Mason, OH (US)

Reexamination Request:
No. 90/009,608, Oct. 16, 2009

Reexamination Certificate for:

| | |
|---|---|
| Patent No.: | **5,467,002** |
| Issued: | **Nov. 14, 1995** |
| Appl. No.: | **08/147,941** |
| Filed: | **Nov. 5, 1993** |

Reexamination Certificate C1 5,467,002 issued May 26, 2009

(51) Int. Cl.
*H02P 1/00* (2006.01)

(52) U.S. Cl. ........................ 318/553; 297/330; 318/280
(58) Field of Classification Search ........................ None
See application file for complete search history.

(56) References Cited

U.S. PATENT DOCUMENTS

| | | | |
|---|---|---|---|
| 4,916,275 | A | 4/1990 | Almond |
| 5,214,360 | A | 5/1993 | Gonser et al. |
| 5,340,953 | A | 8/1994 | Krebs |

OTHER PUBLICATIONS

AMSCO, QUANTUM 3080RC Surgical Tables Brochure, 1988.
AMSCO, QUANTUM 3080RI Surgical Tables Brochure, 1990.
Midmark, Installation and Operation Manual: 712 Power Plastic Surgery Table, 1992.
Midmark, 712 Power Plastic Surgery Table, 1992 ("1992 Midmark 712B").
Midmark Medical Products, Parts List and Service Manual: Midmark Model 405 Medical Examination Table, 1988.
Midmark, 405 Power Examination Table Designer Series, 1991.
Midmark, Installation and Operation Manual: Model 411 Power Medical Examination Table, 1990.
Midmark, Equipment Specifications, 1986.
Midmark, 411 Universal Power Table Designer Series.
Midmark, Installation and Operation Manual; Model 414 Podiatry Treatment Chair, 1989.
Midmark, 414 Power Podiatry Surgery Table: Service and Parts Manual, 1994.
Midmark, 414 Power Podiatry Surgery Table: Designer Series, 1990.
Midmark, Installation and Operation Manual: Model 416 Podiatry Examination Chair, 1989.
Midmark, 416 Power Podiatry Examination Chair: Service and Parts Manual, 1994, rev. 2000.

(Continued)

*Primary Examiner*—Andrew L Nalven

(57) ABSTRACT

An adjustable chair including a control system based around a microprocessor and operated by way of switches preferably located on each side of the seat back. The switches are low voltage flat membrane switches by which the operator moves the chair to a desired position. The switches present a low voltage and sterile environment for both the operator and the patient. The switches can also be easily programmed by the operator to act either in a "momentary" fashion to cause movement of the chair only as long as they are depressed or in a "maintaining" fashion whereby a single depression of a switch causes selected movement of the chair until such movement is stopped by, for example, a limit switch. In addition, one of the switches can also easily be programmed by the operator to alternatively act as either a recline switch or an "auto up" switch. The auto up switch causes the chair to assume a raised and reclined position suitable for performing a specific medical procedure. The control system of the present invention further provides a switch disable feature which allows the operator to easily program the system to disable the switches thereby preventing unauthorized, potentially dangerous or damaging operation of the chair. A selectively operable switch beep on feature is also disclosed.

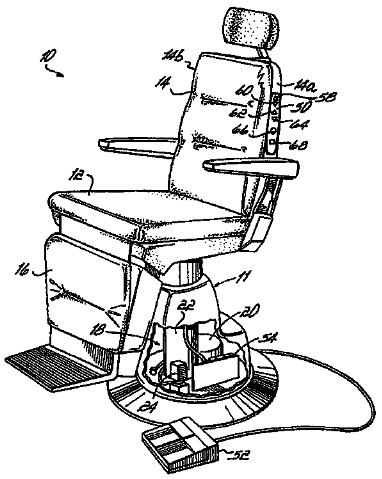

OTHER PUBLICATIONS

Midmark, 416 Power Podiatry Examination Chair: Designer Series, 1989.

Midmark, Installation and Operation Manual: Model 417 Podiatry Treatment Chair, 1989.

Midmark, 417 Power Podiatry Treatment Chair: Designer Series, 1990.

Midmark, Chick Surgical Table Model SE 2001 Remote Control: Operator's Manual Maintenance Manual, at least as early as 1989.

Healthco International, "Aristocrat Deluxe Dental Chair" brochure 1989.

Healthco International, "The Celebrity Dental Chair" brochure, Apr. 1987.

Dental Products Report, "1991 Schein Euro–Crusader" advertisement, 1991.

Planmeca Oy, "PM 2002 CC," circa Jan. 1989.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 22-26 and 42-43 is confirmed.

Claim 11 was previously cancelled.

Claims 1-10, 12, 14 and 28-29 are cancelled.

Claims 13 and 46 are determined to be patentable as amended.

Claims 15-21, 27, 30-41, 44, 45, 47 and 48 were not reexamined.

13. [The chair of claim 12] *A powered adjustable chair comprising:*

*a seat connected to a base for vertical movement with respect thereto and having a surface for supporting a patient;*

*a back forming part of said chair and secured proximate one edge of said seat, said back having a surface for supporting a patient;*

*a powered motion mechanism operatively connected to at least one of said seat and said back;*

*a first power supply connected to said powered motion mechanism for supplying power thereto at a first predetermined voltage;*

*a control electrically coupled to said powered motion mechanism for controlling the operation thereof, said control including a switch plate operatively connected to a microprocessor, said switch plate including a plurality of flat, tactile-feel membrane switches each including a flat outer surface exposed on an outside surface of said seat back for allowing an operator to directly depress said flat outer surface and direct the operation of said control and to thereby also direct desired powered movement of said chair; and,*

*a second power supply connected to said control for supplying power to said control including said membrane switches at a second predetermined voltage which is less than said first predetermined voltage,*

*wherein said control further includes a control circuit responsive to an actuation of a disable switch and operative to selectively disable said switches on said switch plate from directing movement of said chair while power is maintained to said control, said disable switch comprises a predetermined combination of switches on said plate, and* wherein said control further includes an enable switch for selectively enabling operation of said switches on said switch plate to direct movement of said chair, and wherein said enable switch comprises said predetermined combination of switches.

46. A method of operating a powered adjustable chair comprising a vertically adjustable seat secured to a base and an angularly adjustable back secured proximate one edge of said seat, and a control including a microprocessor electrically coupled to power lift and recline mechanisms of said chair for controlling lifting and reclining of said chair, said microprocess selectively providing alternative first and second output signals in response to actuation of one of a plurality of input switches electrically coupled to said control, wherein said first output signal is set to an ON state in response to closing contacts in said one input switch to thereby cause a first predetermined movement of at least one of said seat and said back, and said second output signal is a maintained auto up output signal that is set to an ON state in response to closing contacts in said one input switch to thereby cause a raising and reclining movement of said chair which is different from said first predetermined movement, the method comprising the steps of:

storing one of said first and said second output signals in said microprocessor; [and,]

setting said one of said first and said second output signals to an ON state by actuating said one input switch to thereby move said chair in a corresponding one of said first predetermined movement and said raising and reclining movement*; and*

*in response to setting said second output signal, subsequently actuating said one input switch to deactivate said maintained auto up output signal of said second output signal.*

* * * * *